(12) United States Patent
Hoots et al.

(10) Patent No.: US 11,468,136 B2
(45) Date of Patent: Oct. 11, 2022

(54) ITEM INVENTORY LOCATING FROM SEARCH QUERIES

(71) Applicant: International Business Machines Corporation, Armonk, NY (US)

(72) Inventors: Harry Hoots, Durham, NC (US); Erik Hochstedt, Durham, NC (US); Dana L. Price, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 602 days.

(21) Appl. No.: 16/252,617

(22) Filed: Jan. 19, 2019

(65) Prior Publication Data
US 2020/0233916 A1 Jul. 23, 2020

(51) Int. Cl.
| | |
|---|---|
| *G06F 16/9537* | (2019.01) |
| *G06F 16/9535* | (2019.01) |
| *G06F 16/29* | (2019.01) |
| *G06F 16/9538* | (2019.01) |
| *G06Q 30/06* | (2012.01) |
| *G06N 20/00* | (2019.01) |

(52) U.S. Cl.
CPC ......... *G06F 16/9537* (2019.01); *G06F 16/29* (2019.01); *G06F 16/9535* (2019.01); *G06F 16/9538* (2019.01); *G06N 20/00* (2019.01); *G06Q 30/0627* (2013.01)

(58) Field of Classification Search
None
See application file for complete search history.

(56) References Cited

U.S. PATENT DOCUMENTS

| | | | |
|---|---|---|---|
| 8,732,155 B2 | 5/2014 | Vegnaduzzo et al. | |
| 9,147,212 B2 | 9/2015 | Pettyjohn et al. | |
| 2002/0087505 A1* | 7/2002 | Smith | G06Q 10/0875 |
| 2008/0301102 A1 | 12/2008 | Liang | |
| 2011/0246442 A1 | 10/2011 | Bartell | |
| 2012/0123667 A1 | 5/2012 | Gueziec | |
| 2013/0282421 A1* | 10/2013 | Graff | G06F 16/9535 |
| | | | 705/14.27 |
| 2014/0129380 A1 | 5/2014 | Nuzzi et al. | |

(Continued)

OTHER PUBLICATIONS

P. Mell, et al. *"The NIST Definition of Cloud Computing"*, NIST Special Publication 800-145, Sep. 2011, Gaithersburg, MD.

*Primary Examiner* — Eddy Cheung
(74) *Attorney, Agent, or Firm* — Robert Shatto; George S. Blasiak; Heslin Rothenberg Farley & Mesiti PC

(57) ABSTRACT

Methods, computer program products, and systems are presented. The method computer program products, and systems can include, for instance: obtaining item search query data from one or more mobile client computer device and location data associated to the item search query data, wherein the location data specifies a location of at least one of the one or more mobile client computer device when initiating an item search query; processing the item search query data and the location data; performing augmentation of an item inventory list in response to the processing indicating that a search query for an item has been initiated by a client computer device located at a venue currently operating as a vending venue; and providing one or more output in dependence on the performing augmentation.

20 Claims, 12 Drawing Sheets

(56) References Cited

U.S. PATENT DOCUMENTS

| | | | |
|---|---|---|---|
| 2014/0156459 A1 | 6/2014 | Zises | |
| 2015/0169597 A1* | 6/2015 | Edge | G06F 16/9537 |
| | | | 707/751 |
| 2015/0348117 A1* | 12/2015 | Busch | G06Q 30/0267 |
| | | | 705/14.44 |
| 2019/0147523 A1* | 5/2019 | Shastry | G06Q 30/0633 |
| | | | 705/26.7 |

* cited by examiner

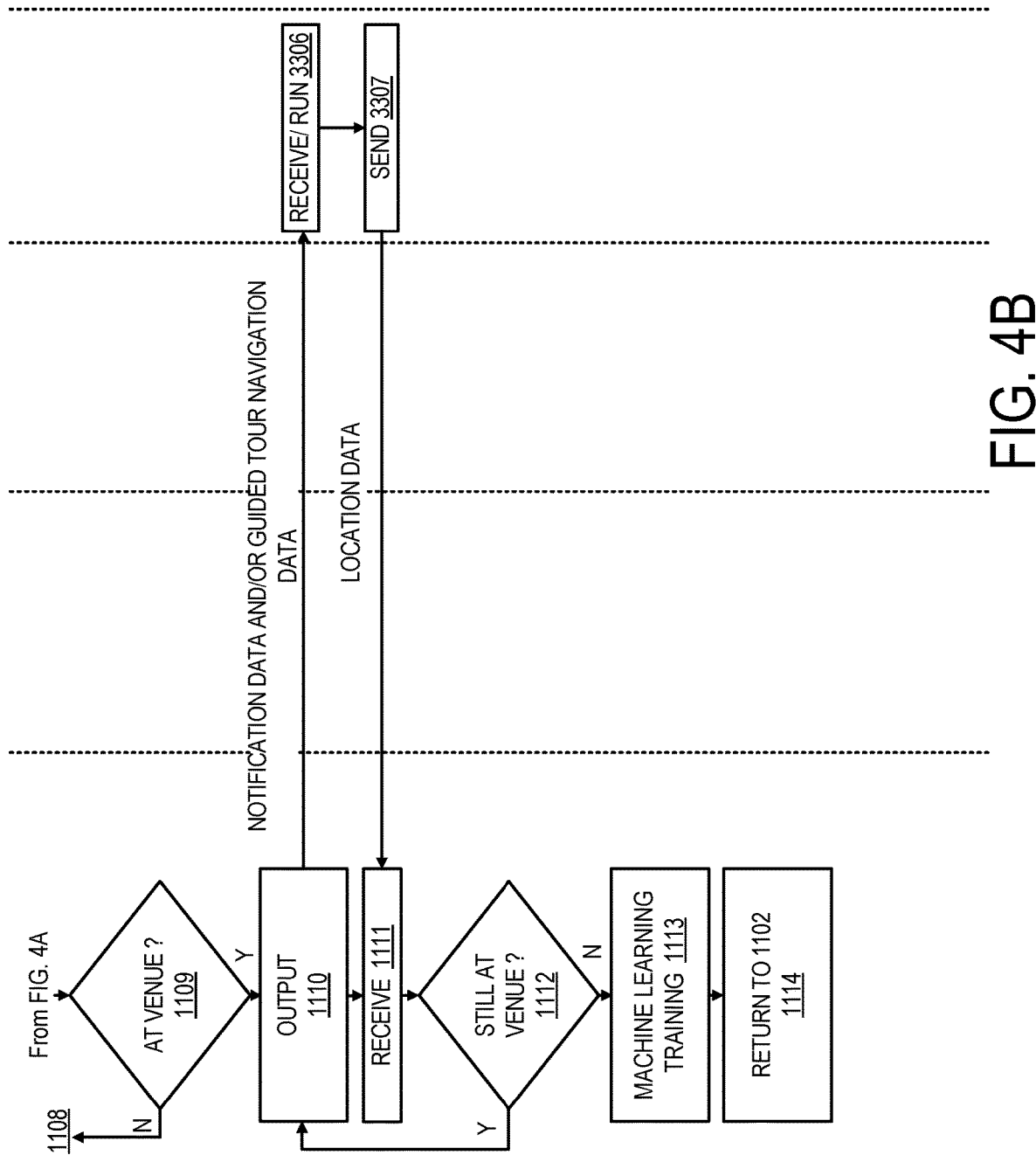

ITEM INVENTORY LOCATING FROM SEARCH QUERIES

BACKGROUND

Location based services (LBS) are software services that use location data to control functionality of computer systems. LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

Data structures have been employed for improving operation of computer systems. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: obtaining item search query data from one or more mobile client computer device and location data associated to the item search query data, wherein the location data specifies a location of at least one of the one or more mobile client computer device when initiating an item search query; processing the item search query data and the location data; performing augmentation of an item inventory list in response to the processing indicating that a search query for an item has been initiated by a client computer device located at a venue currently operating as a vending venue; and providing one or more output in dependence on the performing augmentation.

In another aspect, a computer program product can be provided. The computer program product can include a computer readable storage medium readable by one or more processing circuit and storing instructions for execution by one or more processor for performing a method. The method can include, for example: obtaining item search query data from one or more mobile client computer device and location data associated to the item search query data, wherein the location data specifies a location of at least one of the one or more mobile client computer device when initiating an item search query; processing the item search query data and the location data; performing augmentation of an item inventory list in response to the processing indicating that a search query for an item has been initiated by a client computer device located at a venue currently operating as a vending venue; and providing one or more output in dependence on the performing augmentation.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining item search query data from one or more mobile client computer device and location data associated to the item search query data, wherein the location data specifies a location of at least one of the one or more mobile client computer device when initiating an item search query; processing the item search query data and the location data; performing augmentation of an item inventory list in response to the processing indicating that a search query for an item has been initiated by a client computer device located at a venue currently operating as a vending venue; and providing one or more output in dependence on the performing augmentation.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 4A-4B is a flowchart illustrating a method for performance by a manager system interoperating with client computer devices in various systems according to one embodiment;

DETAILED DESCRIPTION

Figure 1:
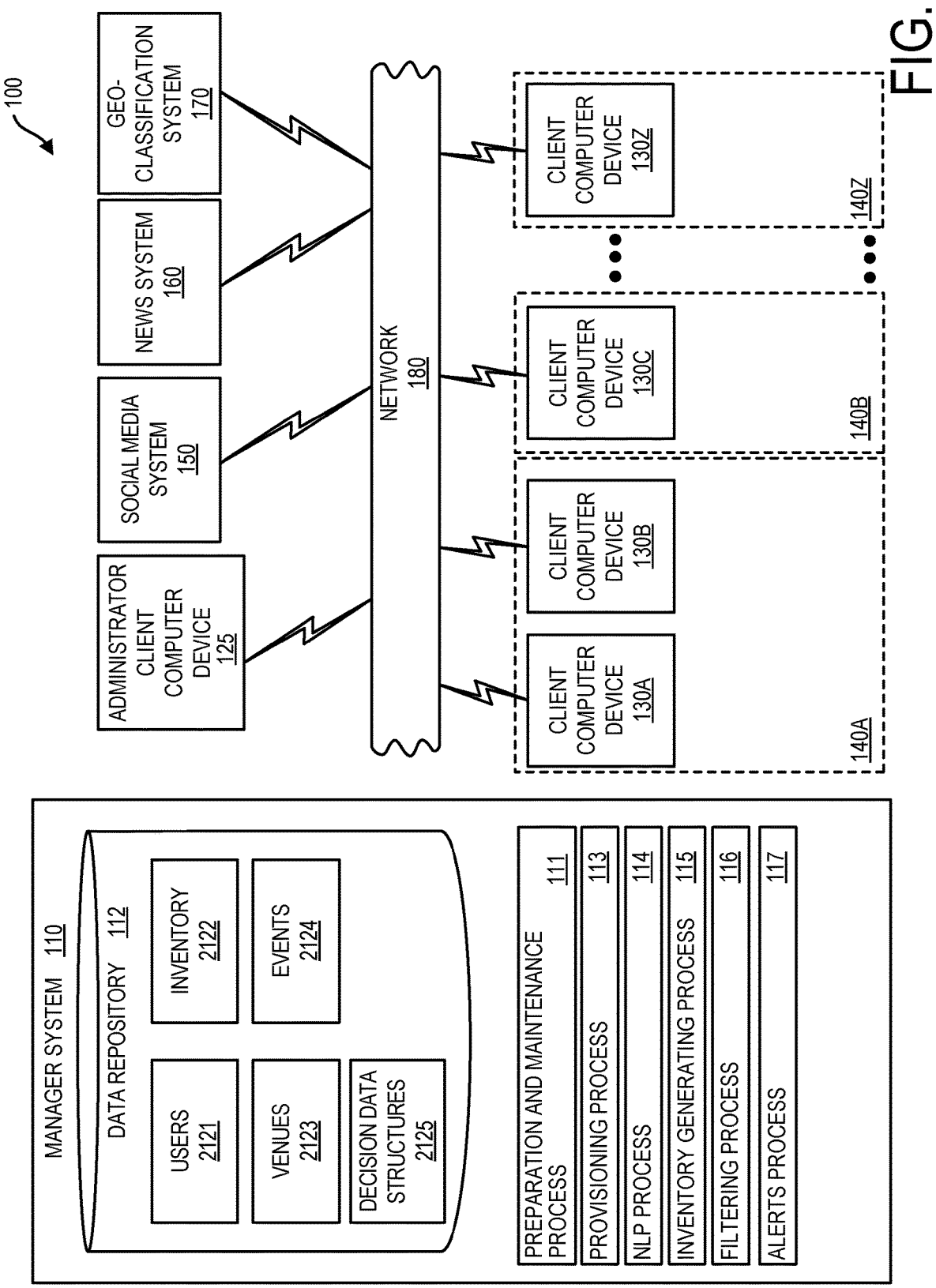
FIG. 1 depicts a system having a manager system, client computer devices, administrator client computer devices, a social media system, a news system, and a geo-classification system, according to one embodiment.

System 100 for use in generating an inventory of items is shown in FIG. 1. System 100 can include manager system 110 having an associated data repository 112, client computer devices 130A-130Z, administrator client computer device 125, social media system 150, news system 160 and geo-classification system 170. Manager system 110, client computer devices 130A-130Z, administrator client computer device 125, social media system 150 news system 160 and geo-classification system 170 can be in communication with one another via network 180. System 100 can include numerous devices which can be computing node-based devices connected by network 180. Network 180 can be a physical network and/or virtual network. A physical network can include, for example, a physical telecommunications network connecting numerous computing-nodes or systems, such as computer servers and computer clients. A virtual network can, for example, combine numerous physical networks, or parts thereof, into a logical virtual network. In another example, numerous virtual networks can be defined over a single physical network.

Client computer devices 130A-130Z can be distributed into a plurality of different venues, e.g. venues 140A-140Z as are depicted in FIG. 1. Client computer devices 130A and 130B can be disposed in first venue, venue 140A. Client computer device 130C can be disposed in a second venue, venue 140B, and client computer device 130Z can be disposed in a third venue, venue 140Z.

According to one embodiment, manager system 110 can be external to client computer devices 130A-130Z, administrator client computer device 125, social media system 150 and news system 160. According to one embodiment, manager system 110 can be co-located with one or more of client computer devices 130A-130Z, administrator client computer device 125, social media system 150, and news system 160 and geo-classification system 170.

Client computer devices 130A-130Z can be mobile computer devices, movable between locations, internal and external to venues 140A-140Z. Client computer devices 130A-130Z can be wireless client computer devices 130A-130Z that can be connected to network 180 by alternative radio communication technologies e.g. via cellular network and/or wireless local area network (LAN), e.g. an IEEE 802.11 wireless LAN.

Embodiments herein recognize that item vending venues can take on a variety of forms. For example, in the classical brick and mortar store, an enterprise can operate the venue and control the item inventory within the venue, often maintaining a detailed list of items available on a venue floor. Some item vending venues can be temporary, for example: fairs and festivals, product shows, flea markets, garage sales, moving sales, block sales, and similar events. Embodiments herein recognize that current processes for ascertaining the inventory associated with a variety of vending venue types is limited. Some vending venues are associated with multiple enterprises and not a single enterprise. For some vending venues, items are presented without any delivery or logging information. Special challenges exist for generation and presentment of item inventory with respect to vending venues as noted herein. Embodiments herein set forth to automatically generate inventory lists associated to item vending venues and to automatically drive automated processes in dependence on generated inventory lists.

Client computer devices 130A-130Z can be associated to certain users. According to one embodiment, users of system 100 can be registered users. Each of the different client computer devices 130A-130Z can be associated to a different user. A client computer device of client computer devices 130A-130Z according to one embodiment can be a computing node device provided by a client computer e.g. a mobile device such as a smartphone, or tablet, a laptop, a smartwatch, that runs one or more program, e.g. including a web browser for opening and viewing pages.

Social media system 150 can include a collection of files, including for example, HTML files, CSS files, image files, and JavaScript files. Social media system 150 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment. During a process of registration wherein a user of system 100 registers as a registered user of system 100, a user sending registration data can send with permission data defining the registration data a permission that grants access by manager system 110 to data of the user within social media system 150. On being registered, manager system 110 can examine data of social media system 150 e.g. to determine whether first and second users are in communication with one another via a messaging system of social media system 150. A user can enter registration data using a user interface displayed on a client computer device of client computer devices 130-130Z. Entered registration data can include e.g. name, address, social media account information, other contact information, biographical information, background information, preferences information, and/or permissions data e.g. can include permissions data allowing manager system 110 to query data of a social media account of a user provided by social media system 150 including messaging system data and any other data of the user. When a user opts-in to register into system 100 and grants system 100 permission to access data of social media system 150, system 100 can inform the user as to what data is collected and why, that any collected personal data may be encrypted, that the user can opt out at any time, and that if the user opts out, any personal data of the user is deleted.

News system 160 can be provided by a news aggregator e.g. a server with appropriate software for aggregating syndicated web content such as online new papers, blogs, podcasts in a central location for easy access. News system 160 can include a rich site summary (RSS) synchronized subscription system. RSS uses extensible markup language (XML) to structure pieces of information to be aggregated in a feed reader. Distributed updates can include e.g. journal tables of contents, podcasts, videos, and news items. News system 160 can include human selected and entered content as well as automatically selected content, selected with use of auto-selection algorithms. Rich site summary (RSS) feeds can include text and metadata that specifies such information as publishing date and author name.

Geo-classification system 170 can associate venues to spatial coordinate ranges associated to the venues. Geo-classification system 170 can include enhanced spatial maps pre-marked with tags to indicate uses associated with map features. Map features can include venues having associated venue areas including venue building areas and/or associated venue parking areas. An enhanced map can include tag specifying usage classifications of venues, e.g. residential, business, public and the like. An enhanced map can be tagged to tag features of a map including e.g. roads, bodies of water and infrastructure features such as building walls defining venues. In some cases an enhanced map can be tagged so that that different parts of a building are tagged differently, e.g. a doorway can be tagged differently from a conference room. Geo-classification system 170 can provide data tags associated to locations that specify uses associated with various locations. Geo-classification system 170 can cognitively map venues identified by venue identifiers, e.g. names, addresses, classifications, and the like, to coordinate location ranges associated to the various venues. Accordingly, manager system 110 querying geo-classification system 170, with location data in the form of coordinate location data, can return an identifier venue. Further, geo-classification system 170 can cognitively map venues that are listed in geo-classification system with uses associated with such venues, e.g. whether such venues are for residential use or business use and include a variety of additional or alternative use classifications, e.g. public use, roadway use, waterway use, and the like. An enhanced map can be tagged to tag features of a map, including e.g. roads, bodies of water and venues. Venues can be provided e.g. by open spaces, such as developed open spaces or undeveloped open spaces, buildings such as open roof building or closed roof buildings, and/or open spaces associated to buildings, such as building associated with a parking lot. For each venue, geo-classification system 170 can associate e.g. identifiers for the venue, ranges and coordinate locations associated with the venue, features associated to the venue, such as building infrastructure features, parking lot features, and other features. Geo-classification system 170 according to one embodiment can be provided by GOOGLE MAPS® (GOOGLE MAPS® is a registered trademark of Google, Inc.).

Data repository 112 can store various data. Users area 2121 of data repository 112 can store data specifying users of system 100. Users of system 100 can include registered users who can be registered to system 100 with use of a user interface such as a web-based user interface provided by manager system 110 and displayed on client computer devices of client computer devices 130A-130Z. On registration, manager system 110 can assign each registered user a registered user ID. Users area 2121 can store user profile data regarding various users such as preferences of various users which can be determined e.g. by way of manager system 110 examining user post data of social media system 150.

Data repository 112 in inventory area 2122 can store data on inventory of items that have been identified by system 100. Embodiments herein recognize that a web-based search for an item can be indicative of a user being in the presence of such item. Embodiments herein recognize that when a user is in the presence of an item that the user is considering acquiring, the user may look up information regarding the item, such as information respecting an alternative price or availability of the item. Embodiments herein can infer based on a web-based search for an item by a user that the user is in the presence of such item, e.g. at a venue in which the item is located. Data repository 112 and inventory area 2122 can store data on an inventory of items in response to web-based item searchers by users for such items. Various data can be associated to items that are referenced in inventory area 2122 such as item classification, item title, item ID number, item location, as well as a time associated with the location.

Data repository 112 in venues area 2123 can store data on vending venues that have been identified. On receipt of an item web-based query for an item, manager system 110 can infer that the item is at a location of the user and accordingly can examine location data associated with a client computer device from which a web-based item search query is initiated. On receipt of one or more item search queries from a certainly defined spatial area, manager system 110 can infer presence of a vending venue and can assign a venue identifier to the venue. Various data for identified venues, stored in venues area 2123 can include data available, e.g. from social media system 150, news system 160, and/or geo-classification system 170 such as geographic coordinates, site maps, satellite maps, overhead views, blueprints, and architectural maps for various venues that can be specified in venues area 2123 of data repository 112.

Data repository 112 in events area 2124 can store data on events such as vending events that are identified by manager system 110. In response to a web-based item query, manager system 110 can infer that a user is in the presence of an item. Data repository 112 in events area 2124 can store data on vending events that have been identified. When manager system 110 receives one or more item query from a common spatial area within a specified time window, manager system 110 can infer that a vending event has occurred, such as a transient vending event of the type that can be associated to the sale of collectible items or similar items e.g. card shows, coin shows, boat shows, classic car shows, auctions, antique shows, and the like.

Data repository 112 in decision data structures area 2125 can store decision data structures for return of action decisions by manager system 110. For example, decision data structures can be provided that cognitively maps alert criterion that are satisfied to action decisions associated to the various respective alert criterion. According to one example, a decision data structure can be provided so that there is returned first action decision on the satisfaction of a first criterion, a second action decision can be returned on the satisfaction of first and second alert criterion, and a third action decision can be returned on the satisfaction of first, second, and third alert criterion.

Manager system 110 can run various processes including preparation and maintenance process 111, provisioning process 113, natural language processing (NLP) process 114, inventory generating process 115, filtering process 116, and alerts process 117.

Manager system 110 running preparation maintenance process 111 can include manager system 110 obtaining data from various data sources, e.g. client computer devices 130A-130Z, administrator client computer device 125, social media system 150, and/or news system 160, and processing data for storage into one or more of areas 2121-2124 in data repository 112.

Manager system 110 running provisioning process 113 can include manager system 110, provisioning client computer devices of client computer devices 130A-130Z by sending installation packages for installation into respective ones of client computer devices 130A-130Z.

Installation packages sent to client computer devices of client computer devices 130A-130Z can include e.g. libraries and executable code so that respective client computer devices of client computer devices 130A-130Z of installation packages sent to manager system 110 can be specially adapted for use in system 100. Provisioning by provisioning process 113 can adapt client computer devices 130A-130Z so that manager system 110 can retrieve and examine web-based item queries initiated by users of client computer devices 130A-130Z. Web-based item queries can be initiated using various types of item search web-portals e.g. general search engine, search web portal, an auction website, a collectible items website, specifically tailored for a particular type of collectible and the like.

Installation packages installed on client computer devices of client computer devices 130A-130Z can also adapt client computer devices e.g. so that the client computer devices are able to display, for visualization, items of information stored in data repository 112 such as inventory area 2122, venues area 2123, and events area 2124. Visualizations can include e.g. text based and or graphics based visualizations and maps, such as geographical maps that depict the presence of items of inventory area 2122 at the specific locations within a vending venue where they are present or have been present in the past in a vending venue.

Manager system 110 can run NLP process 114 to process data for preparation of records that are stored in data repository 112 and for other purposes. Manager system 110 can run NLP process 114 for determining one or more NLP output parameter of received message or queried data source. NLP process 114 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/ or "sadness" or other classification process for output of one or more other NLP output parameters e.g. one of more "social tendency" NLP output parameter or one or more "writing style" NLP output parameter.

By running of NLP process 114 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level (whether the expressed opinion in a document, a sentence or an entity feature/aspect is positive, negative, or neutral. Advanced sentiment classification can classify beyond a polarity of a given text). Advanced sentiment classification can classify emotional states as sentiment classifications. Sentiment classifications can include the classification of "anger," "disgust," "fear," "joy," and "sadness."

Manager system 110 running inventory generating process 115 can include manager system 110 establishing an inventory of items that are available to users of system 100 or which have been available to users of system 100 in the past, e.g., which were available at past vending events now terminated. Manager system 110 running inventory generating process 115 can include manager system 110 examining item search queries initiating by users using their respective client computer devices 130A-130Z. To generate an inventory list, manager system 110 can infer that a searched for item searched for by a user is located at an area in common with the user's client computer device at the time the user initiated the item search. Embodiments herein recognize that users commonly are in the presence of items when searching for information on such items using a web-based searches.

Manager system 110 running inventory generating process 115 can include manager system 110 running filtering process 116. Manager system 110 running filtering process 116 can include manager system 110 filtering web-based item searches received by manager system 110 so that not all web-based item searched receives by manager system 110 are inferred as indicating that a user of a client computer device is in an area. Manager system 110 running filtering process 116 can include manager system 110, intelligently filtering web-based item search queries from users e.g. using a multiple factor scoring formula in generating an inventory item list in inventory area 2122, based on a threshold score being exceeded. A multiple factor scoring formula can include such factors e.g. a geo-classification factor which can use administrator settings data which have been set by an administrator user, a data source factor e.g. based on a scan of one or more data sources e.g. social media system 150 and/or news system 160 for records specifying current venue as a vending venue, a time factor, a geo-spatial compatibility factor, based on the compatibility of a search item to spatial constraints associated with a venue from which a current search has originated, a multiple users factor based on a number of and/or diversity of users and or requests from users requests originating from a current venue, and a predictive model factor, based on returned data returned from a queried predictive model that has been trained by machine learning.

Manager system 110 running alerts process 117 can examine user defined data defining using a user interface, and based on the examined data, can establish alerts. Manager system 110 running alerts process 117 can provide one or more output based on one or more alert criterion being satisfied. The user can establish an alert so that an alert criterion is satisfied based e.g. on an inventory list being incremented for (a) a specified item ID number; (b) a specified item classification, and/or (c) item inventory increment occurring for an item having a specified descriptive element. Manager system 110 running alerts process 117 can include manager system 110 sending e.g. notification data and/or control data to a client computer device.

Notification data specified to a user can include a notification specifying that an item matching one or more criterion of an established alert, established by user, has been added to an inventory specified in inventory area 2122. Control data can include data activating a process e.g. can include navigation data for use by a navigating application by a client computer device that navigates a client computer device to a venue at which an item is located. According to one embodiment such client computer device can be docked in a self-driving vehicle and the navigation data can navigate a user to a vending venue that is specified in an alert.

Control data of an alert can in addition or alternatively include guided data navigation data tour data that can e.g. present to a user, a feature map specifying features of a venue, as well as indicators for the locations of inventory items within the venue. Control data provided by guided tour data and e.g. provide voice active commands to direct a user to a specific location or locations within a venue, having items that are specified in inventory area 2122. Control data provided by guided tour data can include control data that controls a client computer device so that the client computer device presents negative feedback to redirect a user in the event the user when traveling within a venue moves in a direction away from a location at which an inventory item is located.

Figure 2:
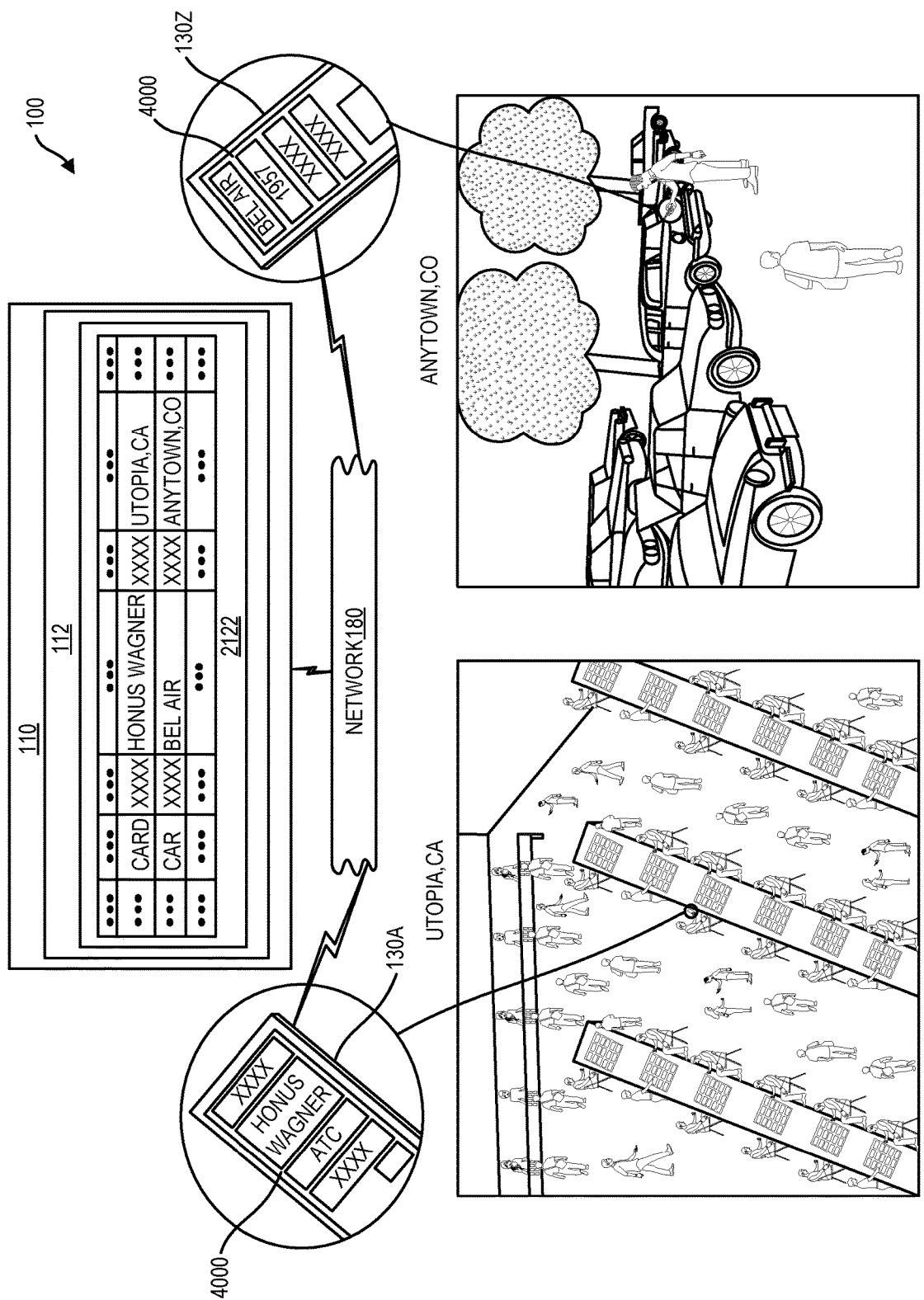
FIG. 2 is a functional schematic view of the system of FIG. 1 according to one embodiment.

FIG. 2 is a schematic view of system 100. A first user can be using a client computer device 130A at a first vending event, a card show, at a first location, Utopia, Calif. A second user can be using client computer device 130Z at a second vending event at a second location, Anytown, Co. The first user can use first client computer device 130A to perform a first search at the first venue for a first item located at the first venue. In response to the search by the first user, manager system 110 can obtain location data of the first client computer device 130A at a time of initiating the first search and can augment an inventory list of inventory area 2122, as shown in FIG. 2, to include the first item and associated data, e.g., title, an item ID, an item description, an identifier of the first venue, a location of the item within the first venue. The second user can use second client computer device 130Z to perform a second search at the second venue for a second item located at the second venue. In response to the search by the second user, manager system 110 can obtain location data of the second client computer device 130A at a time of initiating the second search and can augment an inventory list of inventory area 2122 as shown in FIG. 2 to include the second item and associated data, e.g., title, an item ID, an item description, an identifier of the second venue, a location of the second item within the second venue. Manager system 110 can provide notification data and/or control data to at least one user of system 100 in dependence on data of inventory area 2122 of data repository 112.

Figure 3:
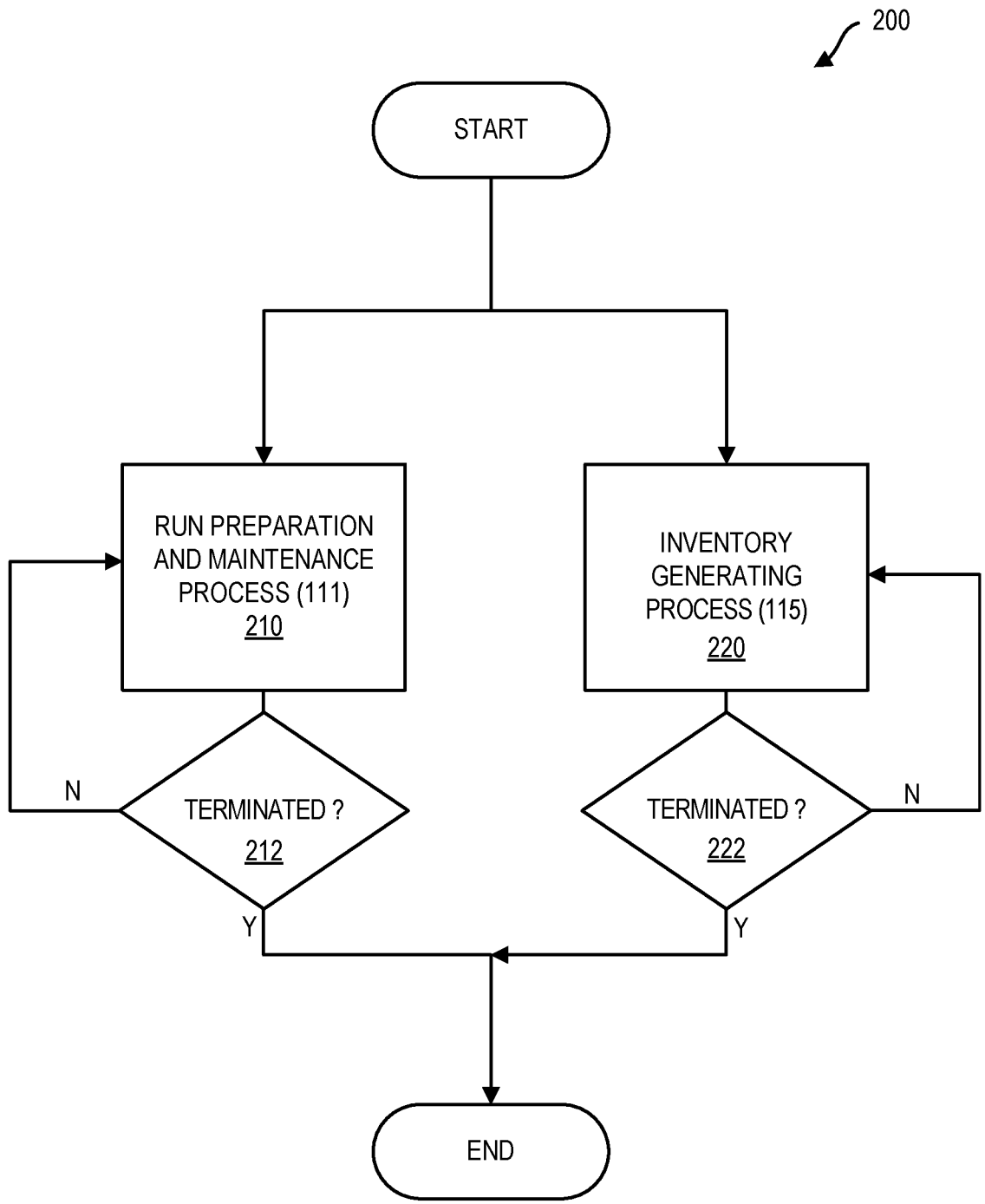
FIG. 3 is a flowchart illustrating a method for performance by a manager system according to one embodiment.

FIG. 3 is a flowchart illustrating a method 200 that can be performed by manager system 110. At block 210 manager system 110 can run preparation and maintenance process 111, e.g. to populate, prepare, and/or maintain various data of data repository 112 such as data of areas 2121-2124. For performance of preparation and maintenance process 111 manager system 110 can be configured to automatically process data inputs received from client computer devices 130A-130C, administrator client computer device 125 and from systems 150, 160, 170. Manager system 110 can run preparation and maintenance process 111 iteratively until preparation and maintenance process 111 is terminated at block 212. At block 220, manager system 110 can run inventory generating process 115. A plurality of instances of inventory generating process 115 can be simultaneously run. Manager system 110 can run inventory generating process 115 until inventory generating process 115 is terminated at block 222. With the performing of inventory generating process 115 iteratively, manager system 110 can be running associated processes iteratively such as processes 113-114 and processes 116-117.

Figure 4A:
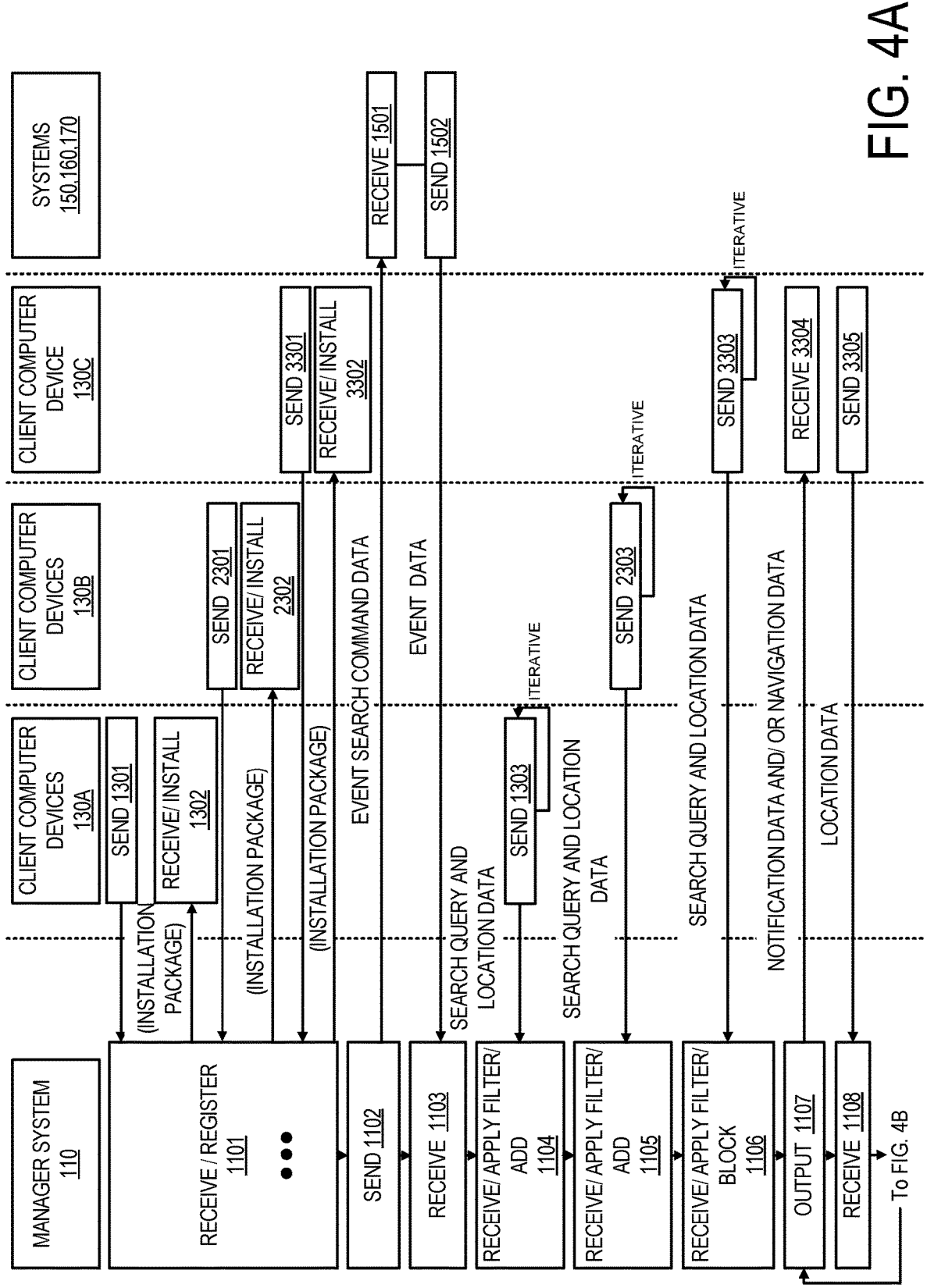

FIGS. 4A-4B is flowchart illustrating a method that can be performed by manager system 110 interoperating with client computer devices 130A-130C and systems 150-160, provided by one or more social media system 150 and one or more news system 160. At block 1301, 2301, and 3301, client computer devices 130A-130C respectively can be sending user defined registration data for receipt by manager system 110 at block 1101.

In response to received registration data received by manager system 110 at block 1101, manager system 110 can register users and can responsively send such users installation packages. Installation packages sent by manager system 110 can be received respectively by client computer devices 130A-130C of client computer devices 130A-130Z, at received blocks 1302, 2302, 3302 respectively. On receipt of installation packages, the respective client computer devices 130A-130C can install the received installation package. Provisioning by provisioning process 113 can adapt client computer devices 130A-130C so that manager system 110 can retrieve and examine web-based item queries initiated by users of client computer devices 130A-130Z. Web-based item queries can be initiated using various types of item search web-portals e.g. general search engine, search web portal, an auction website, a collectible items website, specifically tailored for a particular type of collectible and the like. Installation packages installed on client computer devices of client computer devices 130A-130Z can also adapt client computer devices e.g. so that the client computer devices are able to display, for visualization, items of information stored in data repository 112 such as inventory area 2122, venues area 2123, and events area 2124. Visualizations can include e.g. text based and/or graphics based visualizations and maps, such as geographical maps that depict the presence of items of inventory area 2122 at the specific locations within a vending venue where they are present or have been present in the past in a vending venue.

In a particular use case described with reference to FIG. 1, use of client computer device 130A-130B can be located within a spatial area of venue 140A whereas the user of client computer device 130C can be located within the spatial area of venue 140B. According to one embodiment, venue 140A can be a vending a venue in which vending of items as occurring. Venue 140B, on the other hand, can be a non-vending venue such as the home residence of the user of client computer device 130C.

Figure 5A:
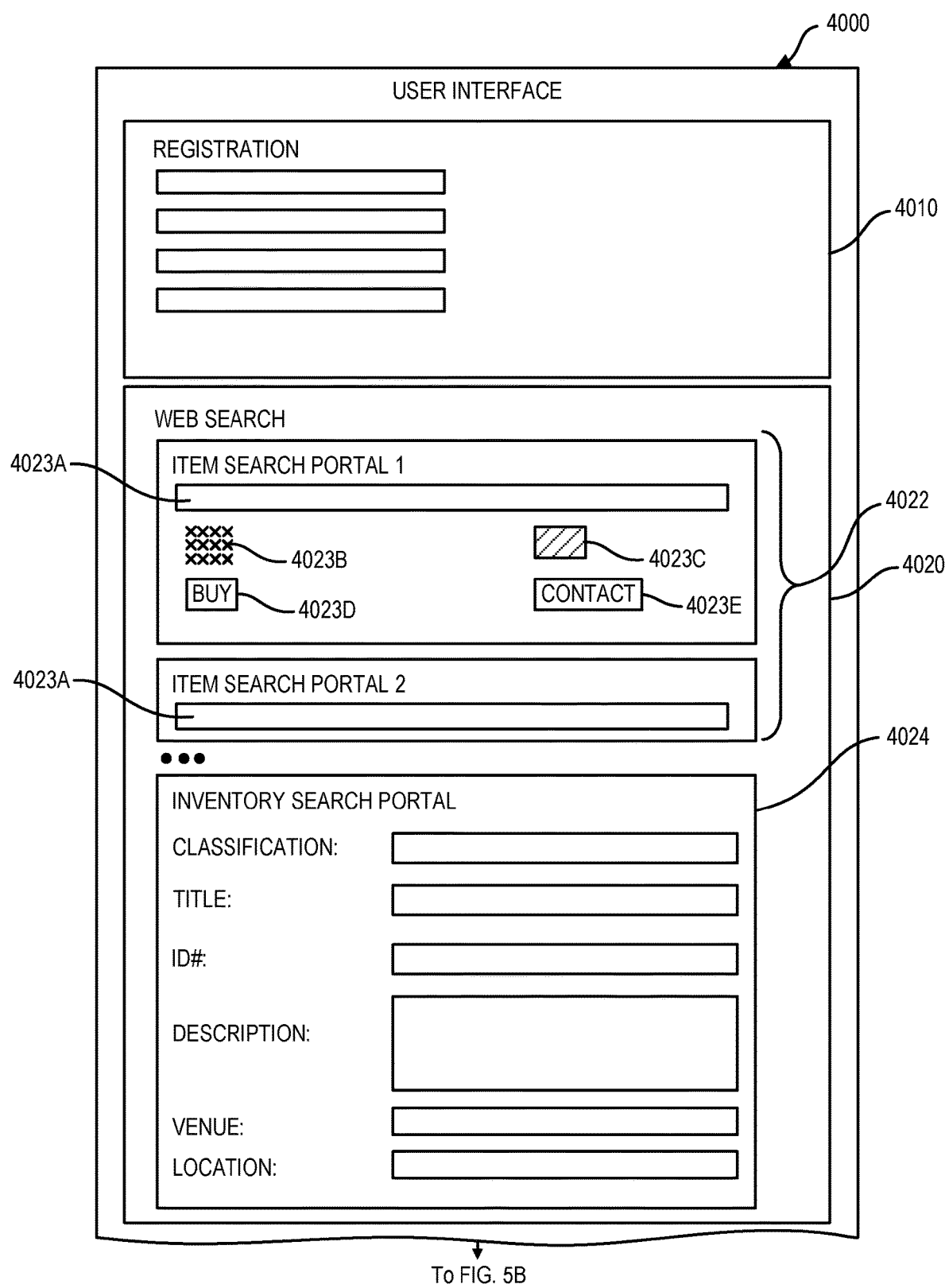
FIGS. 5A-5B depict a user interface, according to one embodiment.
Figure 5B:
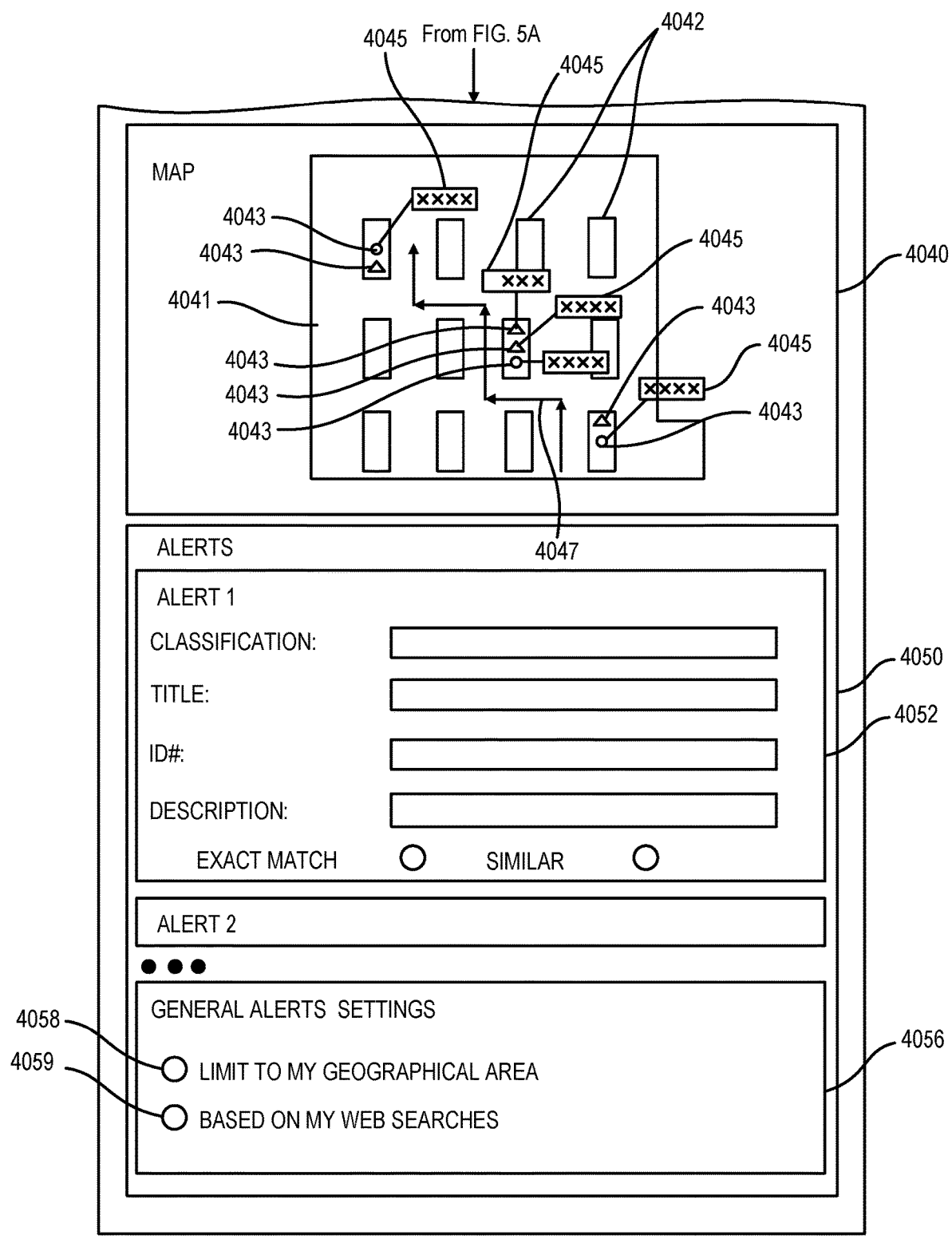

User interface 4000, which can be provided e.g. with use of web pages served by manager system 110, for display on displays of client computer devices 130A-130C, is illustrated in FIGS. 5A-5B. User interface 4000 which can be a displayed user interface can include registration area 4010 that allows a user to submit registration data, which can be sent to manager system 110 e.g. at blocks 1301, 2301, 3301 to facilitate registration of users as registered users of system 100. In addition to registration area 4010, user interface 4000 can include web search area 4020 that allows a user to perform web-based item searches, which web-based item searches can be examined in manager system 110 and which can result in inventory list of inventory area 2122 being incremented when certain conditions apply. Web search area of user interface 4000 can also include general item search area 4022 and inventory search area 4024.

User interface 4000 can include area 4040 including a map with text data and graphics data, and alerts area 4050 for setting up alert criterion which when satisfied can result in notification data and/or control data being sent to one or more client computer device of client computer devices 130A-130C.

In response to registering a plurality of users, such as users of client computer devices 130A-130Z, manager system 110 at block 1102 can send to systems 150, 160, and 170 for receipt at block 1501 event search command data to search for information specifying the existence of a venue vending event. In response to the event search command data received at block 1501, systems 150, 160, 170 can send event data to manager system 110 for receipt by manager system 110 at block 1103. In response to being registered in system 100, a user may grant to manager system 110, a permission that permits manager system 110 to examine contents of social media system 150. Thus, at block 1102 manager system 110 can examine contents of social media system 150 e.g. blogs, postings, and the like of users of client computer device 130A-130Z, or news system 160, or geo-classification system 170, for text-based records indicating the existence of a venue vending event e.g. a collectibles show, or another event as set forth herein.

Manager system 110 can also examine data of news system 160, text-based records that specify the existence of a vending venue event. In response to identifying a record of a venue vending event, manager system 110 at block 1103 on receipt of event data sent by systems 150-160 at block 1502, can update records of venues area 2123 and events area 2124 of data repository 112. Event records examining, performed by manager system 110 at block 1102 can include manager system 110 activating NLP process 114 e.g. so that manager system 110 can segment and further process text of text-based content.

Text-based content of a user's blog on social media system 150 may, for example, specify that a user is planning to attend collectibles show at a certain venue location in time. Manager system 110, based on the NLP processing of such text-based data, can enter into venues area 2123 and events area 2124 data of identified vending venues and data of vending events. Records for the identified vending venue and venue event. At block 1303, 2302, 3303 client computer device 130A client computer device 130B and client computer device 130C, respectively, can be sending search query and location data to manager system 110 for receipt by manager system 110 at block 1104, 1105, and 1106 respectively (manager system 110 can receive location data specifying a location of a certain client computer device from the certain client computer device and/or from a resource of an alternative locating service). Users can be using general item search area 4022 of user interface 4000 to enter item search query data and/or area 4024 provided by an inventory portal to search for items added to an inventory list by manager system 110. Area 4022 can include one or more publicly accessible item search portal available on the world wide web. At block 1104, 1105, and 1106 respectively manager system 110 can obtain location data of the certain client computer device used to initiate a search and can query geo-classification system 170 to determine an identifier for a current venue in which the certain client computer device based on the spatial coordinate range to venue associating data of geo-classification system 170.

An item search portal of general item search area 4022 can include various features that can be displayed on user interface, e.g. area 4023B can be a text area where text specifying e.g. an identifier (e.g. an ID #), title, a description, and a price, of a searched for item is returned in response to user entry of search term(s) in area 4023A to define a search query. Area 4023C can be a pictorial area and can include a picture of an item returned in in response to user entry of search term(s) in area 4023A to define a search query. Area 4023D can be a feature area (e.g. a buy button) that can be interacted with by a user to allow a user to purchase the item returned in response to user entry of search term(s) in area 4023A to define a search query. Feature area 4023D in one embodiment can display the text "ADD TO SHOPPING CART". Area 4023F can be a feature area that allows a searcher to contact a seller e.g. via email, in response to user entry of search term(s) in area 4023A to define a search query.

As noted, the users of client computer devices 130A and 130B in an illustrative use case can be located within a spatial area of venue 140A, whereas client computer device 130C can be within a spatial area of venue 140B. Venue 140A can be a vending venue and venue 140B can be a non-vending residential venue.

The users of client computer device of 130A-130C can be entering search queries using area 4020 of user interface 4000. Area 4020 of user interface 4000 defining a web search area can include in area 4022 a plurality of web search platforms, e.g. one or more general search engine platform, one or more auction site platform, one or more generic item vending platform, one or more specialty item trading platform. Area 4022 represents available provider specific web based portals e.g. as provided by a general search engine such as the GOOGLE® search engine, (GOOGLE® is registered trademark of Google Inc.), an online generic item vending site, e.g. EBAY® or CRAIGSLIST® (EBAY® is a registered trademark of Ebay Inc. and CRAIGSLIST® is a registered trademark of Craigslist Inc.), or a collectibles specific search engine as may be available on a collectibles specific website. A collectible or other specialty item specific search engine can also be utilized e.g. for collectible or specialty items such as e.g. baseball cards, coins, stamps, boats, custom cars, antiques, and the like.

Web search area 4020 can include area 4024 provided by an inventory search portal that allows a user to search for items that are specified in inventory area 4122 as a result of user of system 100 performing a web-based search, e.g. using area 4022 and/or area 4024. Using area 4024 can enter specifying data of an item and manager system 110 can return data of matching items referenced in inventory area 2122. Manager system 110 can return text based and/or graphics based notification data as depicted in area 4040 of user interface 4000. Manager system 110 can send notification data to a querying client computer device to result in display of a map as shown in FIG. 5B having text based data of one or more matching item and graphics data depicting location of the one or more matching item within a venue. Where matching items are in more than one venue, maps of the more than one venue can be displayed in area 4040. A user can use area 4024 to specify a current venue or location in terms of coordinates, and in response manager system 110 can display text data and/graphics data of inventory items at the venue e.g. as shown in area 4040. Manager system 110 according to one embodiment can be configured to monitor a current location of a client computer device and in response the client computer device entering a coordinate range of a certain venue, manager system 110 can automatically display a notification as shown by area 4040 having text data and graphics data specifying items currently within the venue, their locations within the venue and indicators of the users whose searches resulted in the items depicted being added to an inventory list.

Item search data that is entered using user interface 4000 can be accompanied by location data, e.g. location data as reported by a global positioning sensor (GPS) integrally disposed in client computer devices 130A-130C. Item search data can be tagged with metadata e.g. timestamp metadata geo-stamping metadata, indicating a location of the querying client computer device at the time of search initiation. Locating services provided by system 100 can locate a computer device of client computer devices 130A-130Z using e.g. GPS based locating services, locating services based on processing of signals received by one or more connection node (cellular network based or wireless LAN (e.g. WIFI based)), or a combination of such services. Where GPS locating services are employed location data metadata tagging can be performed by a client computer device.

Where non-GPS locating services are employed location data metadata tagging can be performed by manager system 110.

Manager system 110 can infer that an item searched for is at a venue in which a searching client computer device but can activate filtering process 116 (FIG. 1) to remove such inference when certain conditions apply. Referring to the flowchart of FIGS. 4A and 4B, manager system 110 applying artificial intelligence (AI) based rules in processing can determine that the item search query received from client computer device 130A at block 1104 is received from an item vending venue and accordingly on receipt of the search query and location data at block 1104 can add the item specified by the query to an item inventory list, specified in inventory area 2122.

Likewise, on receipt of search query and location data from client computer device 130B at block 1105 manager system 110 can determine that the search query was received by a client computer device, disposed in an item vending venue; and, accordingly, on receipt of the search query and location data at block 1105 can add the items specified in the data query together with the current location of client computer device 130B into an inventory list of inventory area 2122.

On the other hand, manager system 110 on receipt of search query and location data from client computer device 130C at block 1106 can activate filtering process 116 to determine that client computer device 130C is not currently at an item vending venue and accordingly at block 1106 can refrain from adding any item record into an inventory list of inventory area 2122 of data repository 112.

Manager system 110 can activate filtering process 116 so that an item inventory addition does not result from each received item search query. Manager system 110 activating filtering process can include manager system 110 employing the formula set forth herein below in Eq. 1.

$$P = F_1 W_1 + F_2 W_2 + F_3 W_3 + F_4 W_4 + F_5 W_5 + F_6 W_6 \quad (\text{Eq. 1})$$

Where P is a scoring factor indicating a likelihood that a received item search query is received from an active vending venue in which a vending event is occurring, $F_1$ is a first factor, $F_2$ is a second factor, $F_3$ is a third factor, $F_4$ is a fourth factor, $F_5$ is a fifth factor, $F_6$ is a sixth factor, and $W_1$-$W_6$ are weights associated to the various factors $F_1$-$F_6$. Referring to Eq. 1, manager system can apply alternative forms of Eq. 1, e.g. including a greater number of factors or a lesser number of factors, e.g., according to one embodiment, can employ a version of Eq. 1 having only one (e.g. any one of the described factors $F_1$-$F_6$).

Figure 6:
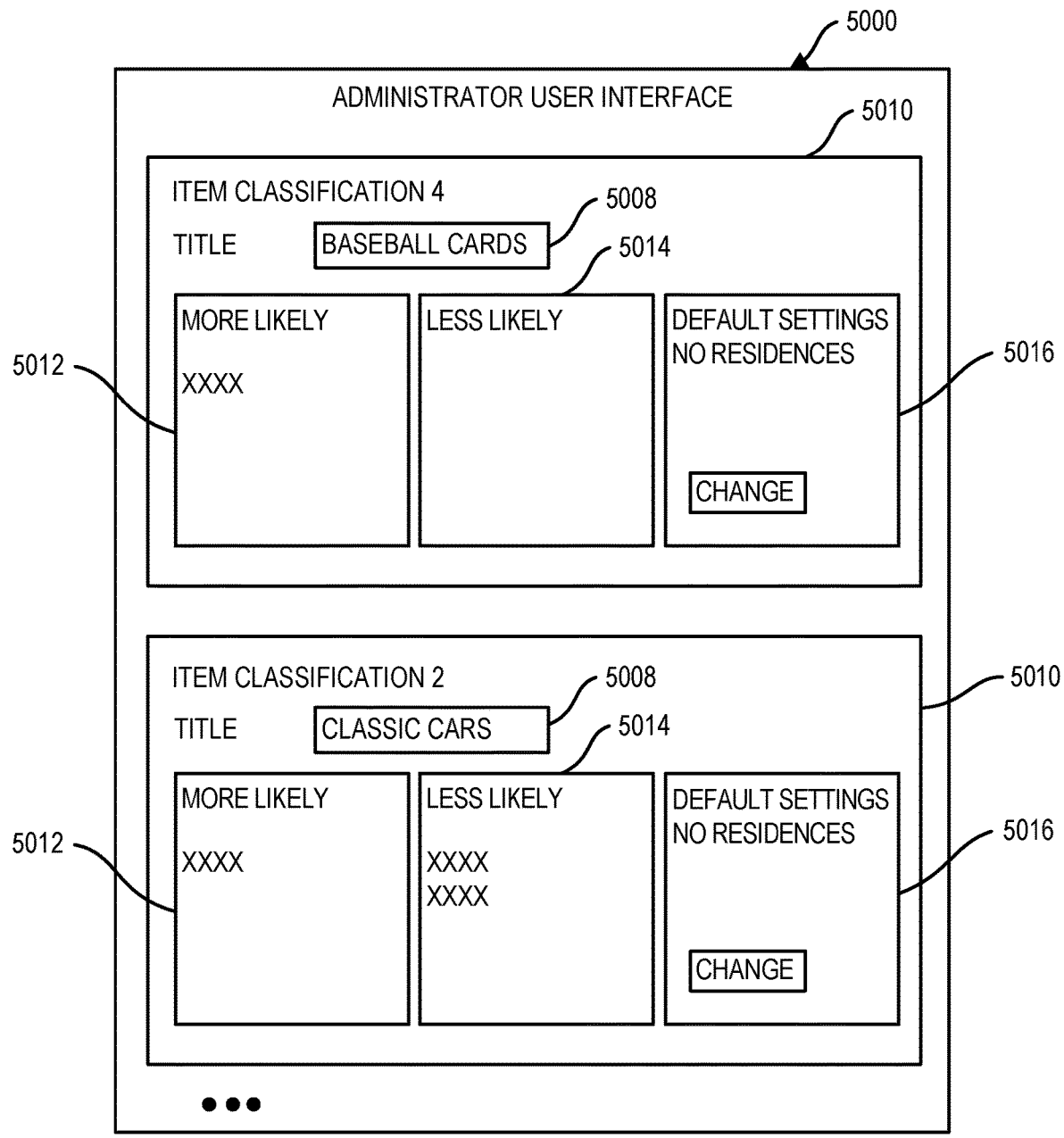
FIG. 6 depicts an administrator user interface according to one embodiment.

According to one embodiment, factor $F_1$ can be a geo-classification factor. Manager system 110 can determine an identifier for a current venue at which a querying client computer device using data of geo-classification system 170 which can associate spatial coordinate ranges to venue identifiers. Referring to administrator user interface 5000 shown in FIG. 6, an administrator user using administrator user interface 5000 can define settings for certain item classifications. For each item classification declared by an administrator user, an administrator user in area 5012 can specify usage classifications associated to venues that are more likely to be indicative of vending venues. As set forth herein, geo-classification system 170 can store usage classifications associated to venues, e.g. general classifications such as residential, business, public usage classifications, and specific usage classifications, e.g. residential-house, residential-apartment, business-restaurant, business-office, public-school, public-park, public-convention center.

In area 5008 an administrator user can specify an item classification and in area 5014 an administrator user can specify criterion for venues that are less likely to be vending venues for a certain item classification. In area 5016, there can be specified default settings which can be applied by default to any classification of items. For example, there can be specified in area 5016 the default setting that no residences can be determined to be vending venues. However, for some classifications of items, vending venues can potentially be provided by personal residences (e.g. in the context of garage sales) in which case an administrator user can use area 5016 to change the default setting.

For scoring the current item search query according to factor $F_1$, manager system 110 can determine an item classification for an item specified in a received search query and can determine whether an administrator user has defined any administrator settings for the item classification using area 5010 administrator user interface 5000. Manager system 110 can examine received location data received with the item search query and can evaluate the location based on the entered criterion entered by an administrator user using area 5010.

Manager system 110 can examine data of geo-classification system 170 to determine a usage classification for location coordinates specified in location data received with a received item search query and can compare the geo-classification to classifications entered into the more likely or less likely areas 5012 or 5014 of user interface area 5010. Manager system 110 can assign a higher value under factor $F_1$ if there is a high degree of correspondence with the return classification and the data of more likely area 5012 and can assign a lower value in the case there is a high degree of correspondence between the returned classification from geo-classification system 170 and the data entered into less likely area 5014 of user interface area 5010. An administrator user can enter freeform text into area 5012 and area 5014 and manager system 110 can activate NLP process 114 to examine the freeform entry text to return a machine understanding of the text.

Referring to factor $F_2$ of Eq. 1, factor $F_2$ can be a data source examining factor in dependence on a result of manager system 110 examining content of social media system 150 and/or news system 160 for data specifying the existence of a venue vending event, as explained in reference to blocks 1102 and 1103 herein. Manager system 110 can assign a higher value under factor $F_2$ in the case that a current location as specified by received item query data as specified with received item query data has been identified by the data source examining of manager system at block 1102 and can assign a lower value under factor $F_2$ in the case current location data associated with the received item search query has not been identified by manager system 110 performing a data search of systems 150-160 at block 1102.

Further referring to Eq. 1, factor $F_3$ can be a time factor. According to one embodiment, manager system 110 can refrain from inferring that a client computer device is at a vending venue event in dependence on the time of the search query. For example, manager system 110 as reflected in the scoring formula of Eq. 1 can determine that there is a low likelihood of a search query being initiated at a vending venue event in the case search is initiated well past business hours, e.g., at 3:00 a.m. Manager system 110 can assign a higher value according to one embodiment under factor $F_3$ where a search query is initiated within valid business hours and can assign a lower value under factor $F_3$ where an item search query is initiated outside of business hours. Manager system 110 can assign lower values under factor $F_3$ in dependence on a time spacing of the search query from the close of business hours. For example, can assign the lower value to a search query received at 10:00 p.m., which is four hours from the close of business of 6:00 p.m. than is assigned to a search query received at 7:00 p.m., which is only one hour from the close of business time.

Factor $F_4$ of Eq. 1 can be a geospatial compatibility factor. According to factor $F_4$, manager system 110 can examine a compatibility for an item classification of an item specified in a web-based item search query in the venue that is specified in location data that is associated to the search query. If the item classification and the current venue of the client computer device are compatible, manager system 110 can assign a higher value under geospatial compatibility factor $F_4$. If, on the other hand, the item classification and the current location of the querying client computer device are not compatible, manager system 110 can assign a lower value under geospatial compatibility factor $F_4$.

According to one example, an item classification returned by manager system 110 for an item specified in a received item search query can be "deep sea ocean boats" and the geo-stamped location data associated with the search query can specify that the search was initiated by client computer device located hundreds of miles from the nearest ocean, e.g., in Colorado, USA. Manager system 110, accordingly, can assign a relatively low value under geospatial compatibility factor $F_4$. According to another example, an item classification determined for received items search query can return the item classification of 'classic cars' and the returned classification returned for location data associated to the search, e.g., which can be returned with use of examining data of geo-classification system 170 can indicate that a client computer device sending the search is currently located in a venue that is too small to house even a single automobile. In such a situation, manager system 110 can again assign a low geospatial compatibility value under factor $F_4$. According to another example, geo-classification system 170 can indicate that a client computer device is sending data from a doorway of a venue building and accordingly away from any area where they may be a display of items. In such a situation, manager system 110 can again assign a low geospatial compatibility value under factor $F_4$. According to another example, an item search query can return the item classification again of 'classic cars', and a returned venue classification for location data associated to the search query can return the venue classification indicating a large scale venue with garage-sized entryways and a concrete floor. In such a situation, manager system 110 can assign a higher value under geospatial compatibility factor $F_4$.

Factor $F_5$ of Eq. 1 can be a multiple users factor. According to one embodiment, manager system 110 can determine that a current venue is more likely to be a currently-active vending venue in the case that multiple different users of system 100 e.g. registered users of system 100 as registered by manager system 110 are currently located within a common venue, as may be determined by data associating spatial coordinate ranges to venue identifiers stored in geo-classification system 170. Manager system 110 can assign a relatively high value under factor $F_5$ where obtained data indicates that a current venue location of a search initiating user is in common with multiple other search initiating users of system 100 and can assign a higher value under factor $F_5$ where an examination of social connections specified in social media system 150 indicates that there is no social connection amongst a majority of such users at the current venue location. Embodiments herein recognize that an absence of a social connection can be indicative of a vending event characterized by multiple users who are strangers to one another traveling to vending event open to the public. Manager system 110 can assign an even higher value according to factor $F_5$ where multiple item queries are received within a certain time period from the current venue location for multiple different users where, based on examination of social media system 150, the different users have minimal or no social connection to one another.

Embodiments herein recognize that a venue is more likely to be a currently active vending venue where there are multiple users having no social connection to one another who are present in a common venue. Embodiments herein recognize that a venue is more likely to be a currently-active vending venue where there are multiple users having no social connection to one another who are present in a common venue who make item queries of commonly-classified items within a specified time window of interest from a common venue location.

Manager system 110 can assign higher values under factor $F_5$ where there have been recent item web-based queries for commonly-classified items at the same venue within a defined time window of the current time. Manager system 110 can assign a lower value under factor $F_5$ where there have been fewer or no prior item queries initiated from the current location for commonly-classified items within a specified time window of the current time. Manager system 110 can assign a lower value under factor $F_5$ where examined data indicates that there is only one registered user of system 100, i.e. the querying user, within the current venue.

With further reference to Eq. 1, factor $F_6$ can be a predictive model factor which is a factor in dependence on data returned from a data query to a predictive model trained by machine learning. According to one example, a predictive model can be trained to model a venue so that the predictive model can be used to predict whether the venue associated to the predictive model is currently operating as a vending venue. Historical data can be applied to the predictive model for training of the predictive model by machine learning. Manager system 110 can assign a higher value according to factor $F_6$ where the predictive model returns the value indicating a higher likelihood that the venue is operating as a vending venue and can return a lower value under factor $F_6$ where the predictive model returns a prediction that the current venue associated to an item search query having an associated geo-stamp is not operating as a vending venue.

According to one embodiment, manager system 110 can infer that a received item search query is received from a venue operating as a vending venue, where a score returned applying Eq. 1 exceeds a threshold and can block and refrain the described inference, where the score key returned applying Eq. 1 is less than a threshold.

According to one embodiment, manager system 110 can be configured to send alerts to users of system 100, based e.g. on alerts set ups that are define by users of system 100. A user of system 100 using one of client computer devices 130A-130Z can set up alerts using alerts area 4050 of user interface 4000, as shown in FIGS. 5A-5B.

In area 4052, a user can enter such data as a classification of items that a user is interested in e.g. baseball cards, coins, stamps, and the like. A title for the item that the user is interested in e.g. "the Honus Wagner baseball card," the ID number for an item that the user is interested in, and/or description of the item that the user is interested in.

Area 4052 can be configured so that a user can enter more or less information into area 4052, e.g. a user can be permitted to leave one or more data field in area 4052 blank.

The user can also specify using area 4052, whether an exact match of text entered into area 4052 is required or only a similarity. Alternatively, whether less than an exact match is required, manager system 110 can respond according to the level of matching that is indicated.

In area 4056, a user can specify general alert settings, which are not item specific. In area 4056, a user can specify e.g. whether alerts are to be limited to current geographical area in which the user is currently located, and can also, using area 4056, specify by a radius of interest, e.g. return results within 500 miles of my current locations, 100 miles, 25 miles, and the like. Using area 4056, a user can specify that alerts can be returned based on item searches of the user. For example, by checking field 4059, a user can specify that alerts are to be returned to the user, in response to a current item search, initiated by the user, using area 4022 of user interface. For example, if the user initiates the search for baseball cards, manager system 110 can immediately return an alert to the user, respecting the most relevant information to the user, arrived by examination of data from inventory area 2122. Selecting area 4058, a user can limit an alert to items specified in inventory area 2122 that are located within a current geographical area of the user.

Referring again to the flowchart of FIGS. 4A-4B, client computer device 130C, currently located at a personal residence, can send item search query and location data associated to the item search query data, per receipt by manager system 110 at block 1106. Manager system 110, in response to the received search query and location data associated to the item search query data, can apply the scoring formula of Eq. 1, and can determine the client computer device 130C is at a venue other than a vending venue, e.g. based on the low scoring value under factor $F_1$ geo-classification factor, based on the setting returning a low value indicates an item search is initiated from a personal residence.

However, in the use case described with reference to the flowchart of FIGS. 4A-4B, the user of client computer device 130C may have checked the field 4059 of alerts area 4050 of user interface 4000 to specify that manager system 110 is to return an alert specifying relevant information, returned by examination of inventory area 2122, in response to a user performing a web based search for an inventory item using area 4022 of user interface 4000. Also, hypothetically, the search query entered by the user of client computer device 130B, sent at block 2303, may have matched alert criterion, entered by the user of client computer device 130C, using alerts area 4050, and specifically area 4052.

Accordingly, based on one or more alert criterion being satisfied, manager system 110 in the described scenario at block 1107 can send to client computer device 130C, per receipt by client computer device 130C, notification data notifying of the alert and/or navigation data. Notification data can include e.g. text-based data and/or graphical based data that indicates to a user that an item matching criterion defined by user area 4052 has been added to an inventory list of inventory area 2122. Notification data can be presented to the user, notifying the user as to the added item as is depicted in area 4040 of user interface 4000.

Manager system 110 can be configured to provide one or more output in response to one or more alert criterion being satisfied, where one or more alert criterion is defined by user defined configuration data, entered using user interface 4000. Manager system 110 can provide one or more output in response to one or more alert criterion being satisfied and can provide one or more alert criterion in dependence on data of an inventory list stored in inventory area 2122. Manager system 110, in response to one or more alert criterion being satisfied can provide on or more output at blocks 1107 and 1110 as set forth in reference to flowchart of FIGS. 4A-4B.

Manager system 110 can send for receipt by client computer device 130C at block 3304, notification data and/or navigation data in response to one or more alert criterion being satisfied. Navigation data can be provided e.g. by formatted web pages display, by display device of client computer device, such as client computer device 130C. Transmitted notification data can result in a visual and/or audible notification being presented by a client computer device receiving the notification. Visual notification can be text based and/or graphics based. A notification having text data and graphics data to be set forth in reference to area 4040 of user interface 4000 (FIGS. 4A-4B). Area 4040 can display a map of a venue determined to include one or more items of an inventory list stored in inventory area 2122.

Area 4040 can include text areas 4045, which include text data that specifies one or more identifier for each inventory item of a venue that is depicted by area 4040. The text areas 4045 can be active to display additional text data, e.g. title and description data e.g. in any display state or on being clicked on. Area 4040 can include one or more indicator 4043, which indicate, in graphical map form, the location of an item within a venue and graphics data 4041, which is a graphical feature depicting a perimeter of a venue. Area 4040 can include graphics data 4042, which are graphical features of item display locations e.g. item display tables within a venue, e.g. according to one embodiment, can depict presentation tables of a venue. Graphics data 4043 provided by graphical indicators e.g. differentiated shapes can graphically depict locations of items. One or more text based indicators that can be displayed within text areas 4045 can include e.g. one or more of a classification of an item, a title of an item, an ID of an item, a time of the search query resulting in the item being added to an inventory list and/or description of an item. Where a notification in the form of area 4040 is presented in response to one or more alert criterion being satisfied, depicted items depicted with graphics data 4043 can be limited to items matching a specified criterion. Where display of area 4040 results from a certain venue identifier being entered into area 4024 (FIG. 5A), or a client computer device entering a spatial coordinate range of the certain venue, manager system 110 can display graphics data including graphical indicators of all items within the certain venue that have been recorded into inventory area 2122.

Item indicators 4043 can be differentiated to specify different users associated to different users. For example, in FIG. 5B, the indicator 4043, provided by "[triangle]", can indicate an inventory item added in response to a query from a first user within a specified time window, and the item inventory indicator "[circle]" can indicate an added inventory item added in response to a search query by a second user. Thus, a user viewing the map of area 4040 can readily determine that there are multiple users at the certain venue depicted within a specified time window, and can readily determine, by examination of area 4040, which user is responsible for the addition of item into inventory. Item indicators 4043 can include associated text boxes 4045 as shown with text data specifying information of an item, e.g. classification, title, item ID #, description, time of associated search, associated user, and the like.

In reference to FIG. 5B, it is seen, for example, that the third column second row item display table has two inventory items indicated by [triangle]'s that were searched for by a first user, and one inventory item indicated by a [circle] that was searched for by a second user. Area 4040 can display path indicator 4047, which presents to a user an optimized path for travel by the user when the user enters the venue that is depicted by the area 4040. For returning an optimized path, manager system 110 can employ a commercial constraint solver software service, such as available from IBM® decision optimization CPLEX® modeling for python. According to one embodiment, manager system 110 can use the IBM® ILOG® CPLEX® Optimization Studio (IBM®, ILOG®, and CPLEX® are registered trademarks of International Business Machines Corporation). One or more output provided by manager system 110 at block 1107 can include notification data for presentment of notification as described with reference to area 4040 of FIG. 5B and/or can include control data e.g. as provided by navigation data.

Navigation data can include data that guides a user from a current location to a location of an inventory item of interest of the user, and/or which guides a user to a location of the item once the user was within a perimeter of the venue. In response to receipt of navigation data at block 3304, client computer device 130C, according to one embodiment, can operate to present prompts, e.g., on a display of client computer device 130C that facilitate the navigation of a user to a location of venue interest to the user, e.g. an item specified in an alert defined by the user. According to one embodiment, the received navigation data received at block 3304 can be used by a vehicle navigation application running on client computer device that present vehicle navigation prompts.

According to one embodiment, navigation data can include self-driving vehicle navigation data. Client computer device 130C can run a self-driving vehicle application that automatically navigates a self-driving vehicle to a venue at which an item of interest to a user is located. Referring to the described example, client computer device 130C at block 3304 can receive navigation data.

For navigating client computer device 130C to a venue at which an item of interest to the user of client computer device 130C is located, at block 3305, client computer device 130C can send to manager system 110 for receipt by manager system 110 at block 1108, location data specifying a current location of client computer device 130C.

In response to the receipt of navigation data at 3304, client computer device 130C can commence movement for navigating client computer device 130C to a venue that is specified in received navigation data, in response to the received location data received by manager system 110 at block 1108. Manager system 110 at block 1109 can determine whether client computer device 130C has reached the venue that is specified by navigation data, received at block 3304 by client computer device 130C.

If the destination of the venue is not yet achieved, manager system 110 can return to output block 1107 to provide one or more output in the form of updated notification data and/or navigation data, to iteratively present notification and/or navigation data for facilitating navigation of client computer device 130C to a venue. On the determination at block 1109 that a specified venue has been arrived at by a client computer device 130C, manager system 110 can proceed to block 1109 to provide one or more output. Manager system 110 at block 1110 can provide one or more output in the form of guided tour navigation data for receipt by client computer device 130C at block 3306.

Guided tour navigation data received and run by client computer device 130C at block 3306 can interactively guide a user to a specific one or more location within a venue. At block 3307, client computer device 130C can send updated location data per receipt by manager system at block 1111. At block 1112, manager system 110 can determine whether the user, in the described scenario, of client computer device 130C is still at the venue, e.g. the venue depicted in area 4040 of user interface 4000 (FIG. 5B). In response to determining that the user is still at the venue, manager system 110 can return to block 1110 to provide one or more output, e.g. in the form of updated guided tour navigation data, which guided tour navigation data can respond adaptively, e.g. to changes of location of a user within a venue, e.g. deviating from a path, depicted by path indicator 4047 (FIG. 5B), and/or updated based on changes to additions in inventory list that have been added to inventory list of inventory area 2122 since the time that the user of client computer device 130C has entered the venue depicted by area 4040.

The sending of search data of client computer devices 130A-130C can be iterative and ongoing as depicted by the loops iterations associated to blocks 1303, 2303, 3303, respectively. Accordingly, at each iteration of output block 1107 and/or output block of 1110, manager system 110 can include updated notification data based on new inventory items being added to an inventory list of inventory area 2122. Client computer device 130C, running a guided tour application, based on received guided tour navigation data, can be providing interactive prompts to user based on a current location of a user within a venue depicted by a map of area 4040 of FIG. 5B. Client computer device 130C can be configured e.g. so that client computer device 130C presents an audio and/or audio e.g. synthesized voice based and/or visual prompts the optimum path depicted by path indicator 4047 as show in area 4040 of FIG. 5B.

Manager system 110 at block 1110 can provide one or more output in the form of guided tour navigation data so that a user having the client computer device using the guided tour navigation data can travel to locations of interest within a venue more efficiently with less time, and, accordingly, with reduced likelihood of collisions with other users in the venue. Embodiments herein recognize that features using guided tour navigation data can significantly improve crowd control within a venue, to avoid e.g. crown bottle-necking, unsafe conditions, improving user safety at a vending venue. Manager system 110 in response to determining that a user has exited a venue at block 1112, can proceed to block 1113.

Manager system 110, according to one embodiment at block 1107 and/or 1110, can send notification data and/or navigation data in accordance with the decision data structure, such as the decision data structure set forth in Table A. Manager system 110, using a decision data structure set forth in Table A, can return differentiated actions in dependence on a condition that is satisfied. For example, in accordance with Table A, manager system 110 can return a first action decision in the case that a first alert criterion is satisfied, can return a second action decision on the condition that first and second alert criterion are satisfied, and can return the third action decision on the condition that first, second, and third alert criterion are satisfied.

Specified actions of an action decisions can include e.g. actions to (A) send text data; (B) send text data with graphics data, or (C) send text data with graphics data and/or navigation data. According to another decision data structure, the first, second, and third conditions associated to the first, second, and third actions specified in table A can be different from those conditions specified in the table A.

TABLE A

| Row | CONDITION | ACTION |
|---|---|---|
| 1 | FIRST ALERT CRITERION SATISFIED | SEND TEXT DATA |
| 2 | SECOND ALERT CRITERION SATISFIED | SEND TEXT DATA WITH GRAPHICS DATA |
| 3 | THIRD ALERT CRITERION SATISFIED | SEND TEXT DATA WITH GRAPHICS DATA AND NAVIGATION DATA |
| 4 | FIRST ALERT CRITERION SATISFIED; THIRD ALERT CRITERION SATISFIED | SEND TEXT DATA WITH GRAPHICS DATA USING PRIMARY AND SECONDARY MESSAGING SERVICE AND NAVIGATION DATA |
| ... | ... | ... |

For example, the condition associated with Row 1 of Table A can be simply the condition that a first alert of a first alert criterion is satisfied, the second condition associated with Row 2 can be simply the condition that a second alert criterion is satisfied, and a condition of Row 3 can be the condition that a third alert criterion is satisfied. A condition of Row 4 can be satisfied when first and third alert criterion are satisfied. Manager system 110 can iteratively train a predictive model via reinforcement machine learning so that action decisions associated with the various rows of decision data structure, e.g. as set forth in Table A., can be iteratively adapted over time for more accurate results and improved performance, and user satisfaction.

Figure 7:
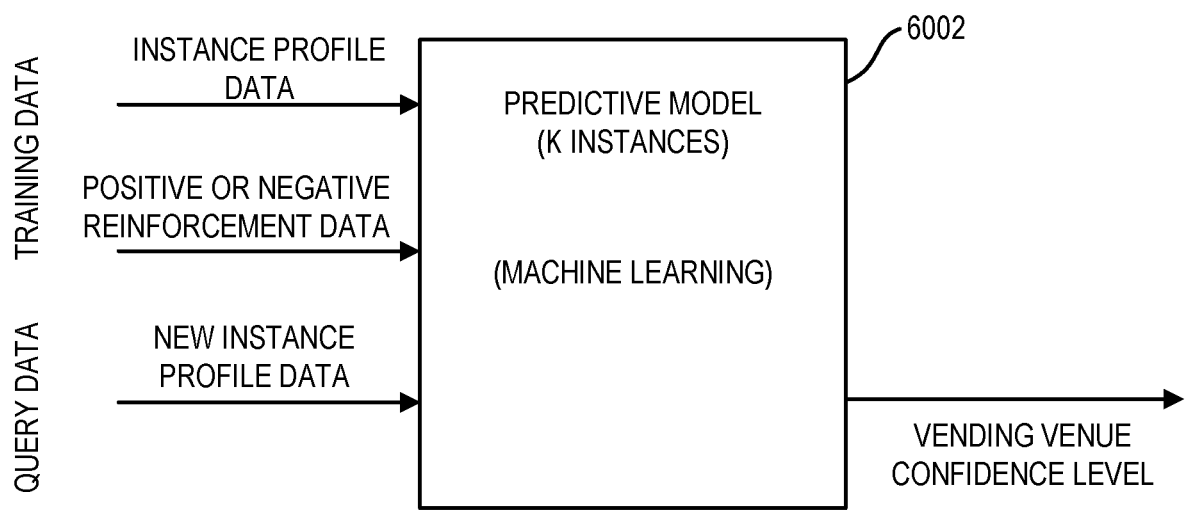
FIG. 7 depicts a predictive model that can be trained by machine learning processes, according to one embodiment.

At block 1113, manager system 110 can perform machine learning training. For example, FIG. 7 depicts predictive model 6002, which can be trained by machine learning.

Predictive model 6002 can be a predictive model that predicts the likelihood of a venue from which an item search query is received being a venue currently operating as a vending venue. Predictive model 6002, as shown in FIG. 7, can be trained using training data that is provided by instance profile data and associated positive or negative feedback, associated with instance profile data. Instance profile data can be data that profiles historical instances in which a certain venue is determined by manager system 110 to be a venue currently operating as a vending venue. Profile data, for each instance, can include e.g. time associated with each instance as well as item data, e.g. classification title, description associated with each historical instance of a venue being determined to be a vending venue. The positive or negative reinforcement data, used as training data, and associated to each instance of instance profile data, can be data which indicates whether a historical determination of a venue being a vending venue was correct or incorrect. Instance profile data, associated to an instance, prompting a user to return to an optimum path, determined by a guided tour application.

Manager system 110 at block 1113 can apply training data to one or more predictive model 6002, based on an examination of travel path data of a user in response to receipt of navigation data by a client computer device of the user at block, response to the sending of the navigation data to the user at block 1107 and/or block 1110.

Where examination of travel data of a client computer device in response to received navigation, data indicates a positive vending browsing pattern, positive reinforcement data can be applied as training data to one or more predictive model 6002. If, on the other hand, examination of user travel data indicates negative venue vending browsing pattern, negative reinforcement data can be applied as training data to one or more predictive model 6002. Positive vending browsing patterns can be characterized by a user exhibiting a pattern of positively engaging of venue, according to interactive live browsing of items within venue, e.g. traveling to a plurality of locations within a venue and pausing at multiple locations (indicative of the user pausing to look at several items at varying spaced locations). A negative venue browsing pattern can be characterized e.g. by the user reaching an entranceway of a venue and then returning to the user's original location without even entering the venue (i.e. a pattern indicative of a venue not being a vending venue, on inspection of the user).

Manager system 110 can be iteratively training multiple instances of predictive model 6002. Manager system, for example, can instantiate k instances of predictive model 6002, one for each venue. Manager system 110 can instantiate an instance of predictive model 6002 for each venue determined by manager system to be a vending venue. Predictive model 6002, once trained by machine learning, can be configured to respond to query data. Predictive model 6002 can respond to query data to return data, indicating whether a venue indicated by a location associated with received item query, is a vending venue. Manager system 110, on receipt of an item query entered into user interface 4000, can examine location data associated to the query (specifying the location from which the query was initiated by a client computer device) to determine a venue associated with the query, e.g. with use of geo-classification system 170. On determination of the current venue, manager system 110 can query the correct instance of predictive model 6002, associated to the current venue. Manager system 110 can then query predictive model 6002 with instance profile data including e.g. a time of the query and item data of the query. Predictive model 6002 can responsively return data, e.g. in the form of a confidence level between 0.0 and 1.0 that indicates a level of confidence that the venue associated to predictive model 6002 is currently operating as a vending venue.

Manager system 110, according to one embodiment, can use predictive model 6002 for return of a scoring value, according to factor $F_6$, described in Eq. 1. Various available tools, libraries, and/or services can be utilized for implementation of predictive model 6002. For example, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models.

Embodiments herein recognize that where a patron user enters a theme-based vending event retail show of vendors, and wants to find a specific item sold by a given vendor, each vendor has different items based on the theme of the show, and often not all vendors have the same items, but most likely at least one vendor has the theme-based item sought by the patron user. Embodiments herein recognize that according to the current state of the art the patron would have to walk from vendor to vendor and manually look for the item resulting in a time consuming shopping experience. If the patron does not visit each vendor, they also run the risk of missing the item they seek. The end outcome is a time consuming experience that may or may not be productive. So, for example, a sports card collector goes to a card show to find a specific player's autographed rookie card. Inside of the card show are approximately 200 tables each representing different individual vendors with varying sports card related wares for sale. The patron user must visit each table to manually look for the baseball card. Eventually the patron user finds the card and purchases it, but not without walking the entire venue and spending a couple of hours, worth of time to find the item. Embodiments herein can help patron users e.g. find retail items more efficiently within a given venue based on locations where other patron users found a similar item.

Embodiments herein recognize that according to a current state of the art users may walk from vendor to vendor to find the item. The user wastes time and may not ever find what they are looking for. A user may ask vendors if they know others who might have the product. The patron again wastes time and may not ever find what they are looking for.

Embodiments herein can feature a manager system 110 which can capture users' search queries along with their current location within a venue to create an inventory of products for storage in an inventory area 2122 of data repository 112. This inventory can then be utilized by others to optimize their shopping experience within the venue.

Embodiments within multiple independent vendor vending venues which sell collectibles, such as card shows, coin shows, comic books, antiques, and the like. Because these vendors are not connected and the vendors' inventories are varied, the patron users' patterns include real-time research when they encounter items of interest in order to gather information such as appropriate price.

A method as set forth herein can include: (a) Patron users can enter into a theme-based venue to shop for items they wish to purchase; (b) when they enter the venue patron or prior to entering a venue users opt-in to registering as a registered user of system 100 installing an installation package on their mobile device client computer device. In a broader implementation, this may be more of a community approach, and thus the user installs the installation package at an earlier point in time, and then uses it for more than one visit or more than one venue; (c) the installed installation package can include an application that has permission to retrieve their application queries from a browser, or within specific enterprise specific installed applications e.g. EBAY®, CRAIGSLIST®, GOOGLE® and the like. Retrieving the application queries can occur based on URLs, URL parameters and/or combinations of certain well-known keywords. Configuration of the keyword parameters, by an administrator can be based on domain-specific trade show or venue theme. This gives tailored insights of interest based on theme of show. Configuration can also include filtering by filtering process 116 to avoid additions to an inventory list based on searches made outside of the venue, or at specified locations like the main entrance or cafeteria, or based on one or more configurable factor. This helps eliminate incorrect inventory/location data. Configuration can also include an expiry date for items listed within the inventory, such that items which are no longer there can be removed from the inventory, or flagged with data indicating that a vending event has terminated; (d) manager system 110 captures the location of a user when they execute a query; (e) manager system 110 builds an inventory list in inventory area 2122 of data repository 112 based on the product details, along with its location (based on the user's location when the query was executed); (f) as other patron users contribute searches, the inventory list stored in inventory area 2122 grows over time; (g) new patron users entering the venue use the service providing inventory area 2122 to query an item; (h) Manager system 110 searches the items of inventory area 2122 for the particular item and will return the location(s) associated with that inventory item; and (i) patron users can also receive push notification messages indicating that products they searched for previously are now present in the inventory due to crowd queries executed since the original search request.

Embodiments herein recognize that according to a current state of the art a user can enter a given trade show, looking for a particular item (or multiple items). The patron user has no other option than to visit every single table within the vending venue trying to find the desired item(s). Their route through the venue can be inefficient and can lead to unnecessary congestion in a vending venue. System 100 can be configured to send to a user notification data that graphically depicts with graphics data an optimal route through the venue and provided navigation data to navigate an optimal route thus streamlining their shopping experience.

System 100 according to one embodiment can be configured e.g. to provide a service supporting a vending event for a narrow classification of items, e.g. vending event for cards, or coins, or stamps. System 100 according to one embodiment can be configured e.g. to provide a service supporting a vending event for multiple classifications of items, e.g. vending event such as a fair where a variety of items of different classifications. System 100 according to one embodiment can be configured e.g. to provide a service supporting a plurality of vending events within a narrowly classified geographical area, e.g. a certain municipality. System 100 according to one embodiment can be configured e.g. to provide a service supporting a plurality of vending events involving different classifications of items over a wide geographical area, e.g. a large country, a collection of countries and in one embodiment the whole world. The vending events can be single item classification events or multiple item classification events.

Certain embodiments herein may offer various technical computing advantages involving computing advantages to address problem arising in the realm of computer systems and computer networks, and, in particular, computer networks operating to provide location-based services (LBS). Embodiments herein can include examining the location associated with received item query entered into a user interface and augmenting an inventory database, an inventory list of a data repository in response to the examining. Based on the inference that a user initiating an item query is in the presence of the item, embodiments herein can include interactively presenting a user with feedback in dependence on data repository content as the data repository content changes in response to item data queries by a plurality of users. Embodiments herein can provide a user with navigation data to facilitate navigation of user to location of a venue, having an item of interest to the user. By the presentment of such navigation data, embodiments herein can facilitate crowd control to reduce dangerous crowding conditions. Embodiments herein can provide interactive prompting to a user to guide a user to a venue, so that a user can efficiently travel to locations of interest within a venue in a manner that is safe and efficient. Embodiments herein can automatically facilitate the generation of inventory data that reflects available inventory items, available to a plurality of users. Decision data structures can be employed for efficient and accurate return of data decisions and such decision structures can be iteratively adapted with use of machine learning processes. Various decision data structures can be used to drive artificial intelligence (AI) decision making, such as decision data structure that cognitively map alert criterion that are satisfied to action decisions. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as AI platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include AI processing platforms featuring improved processes to transform unstructured data into structured form permitting computer based analytics and decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription. The static optimization service may be provided for subscribed business entities and/or individuals in need from any location in the world.

Figure 8:
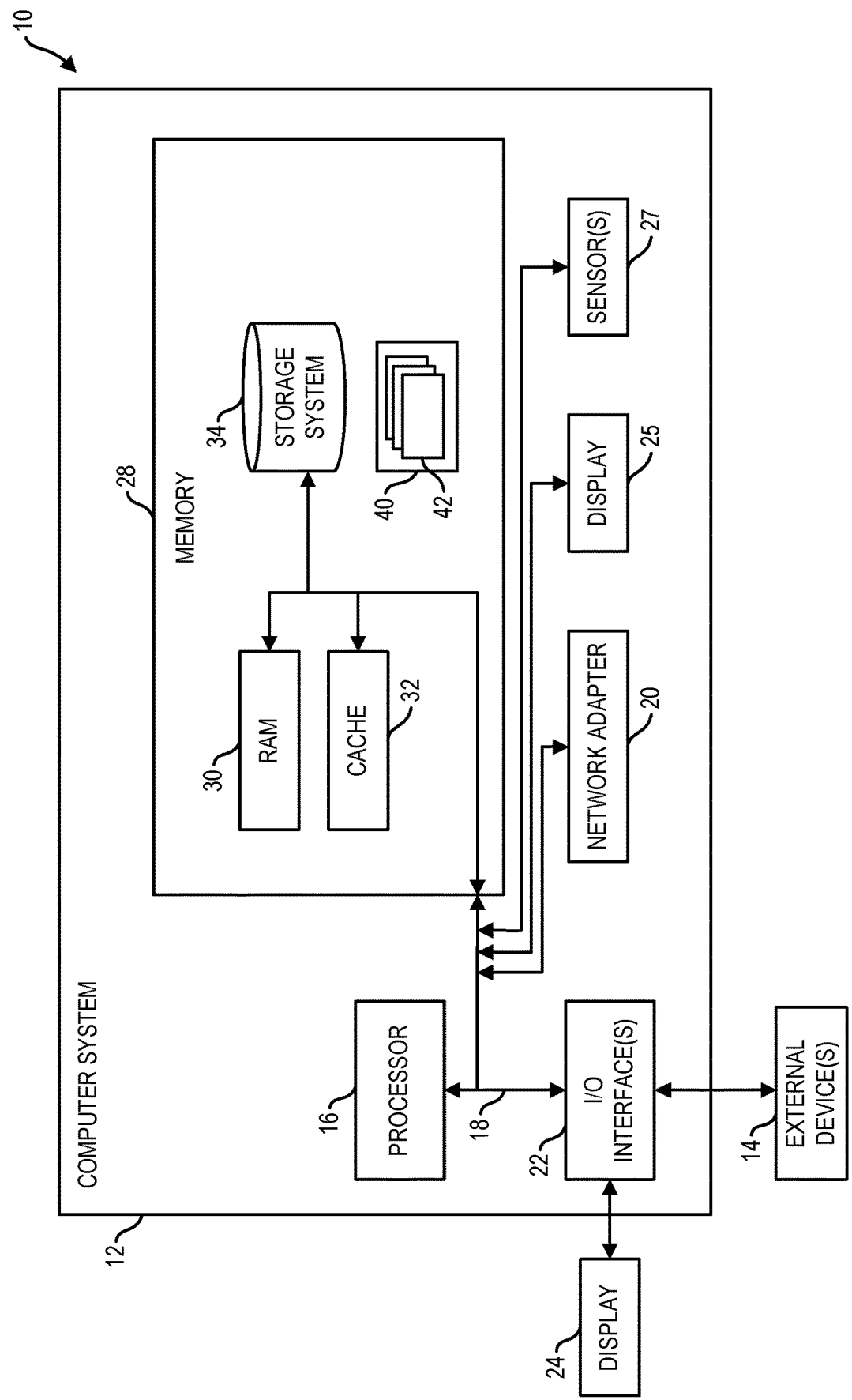
FIG. 8 depicts a computing node according to one embodiment.
Figure 9:
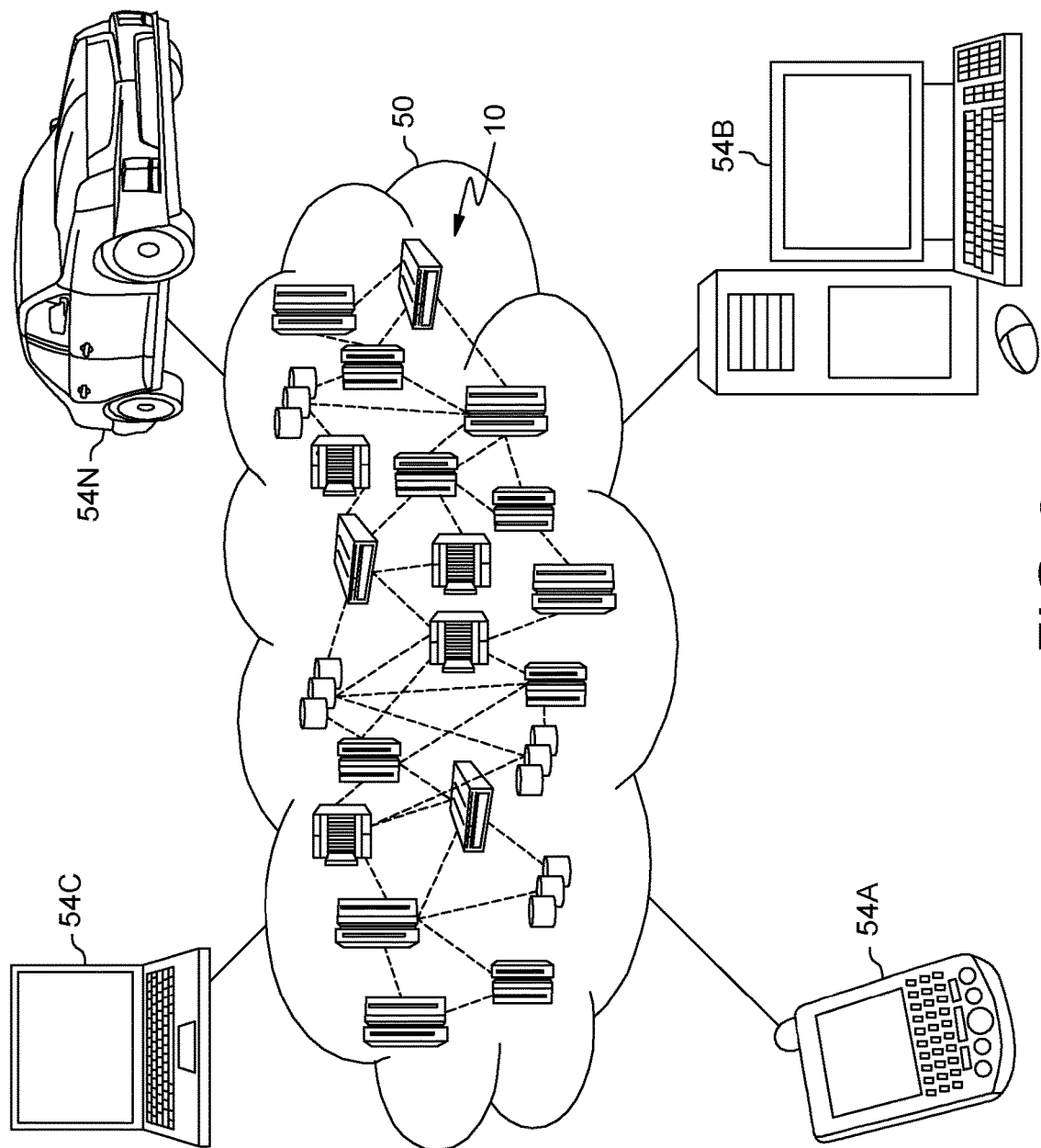
FIG. 9 depicts a cloud computing environment according to one embodiment.
Figure 10:
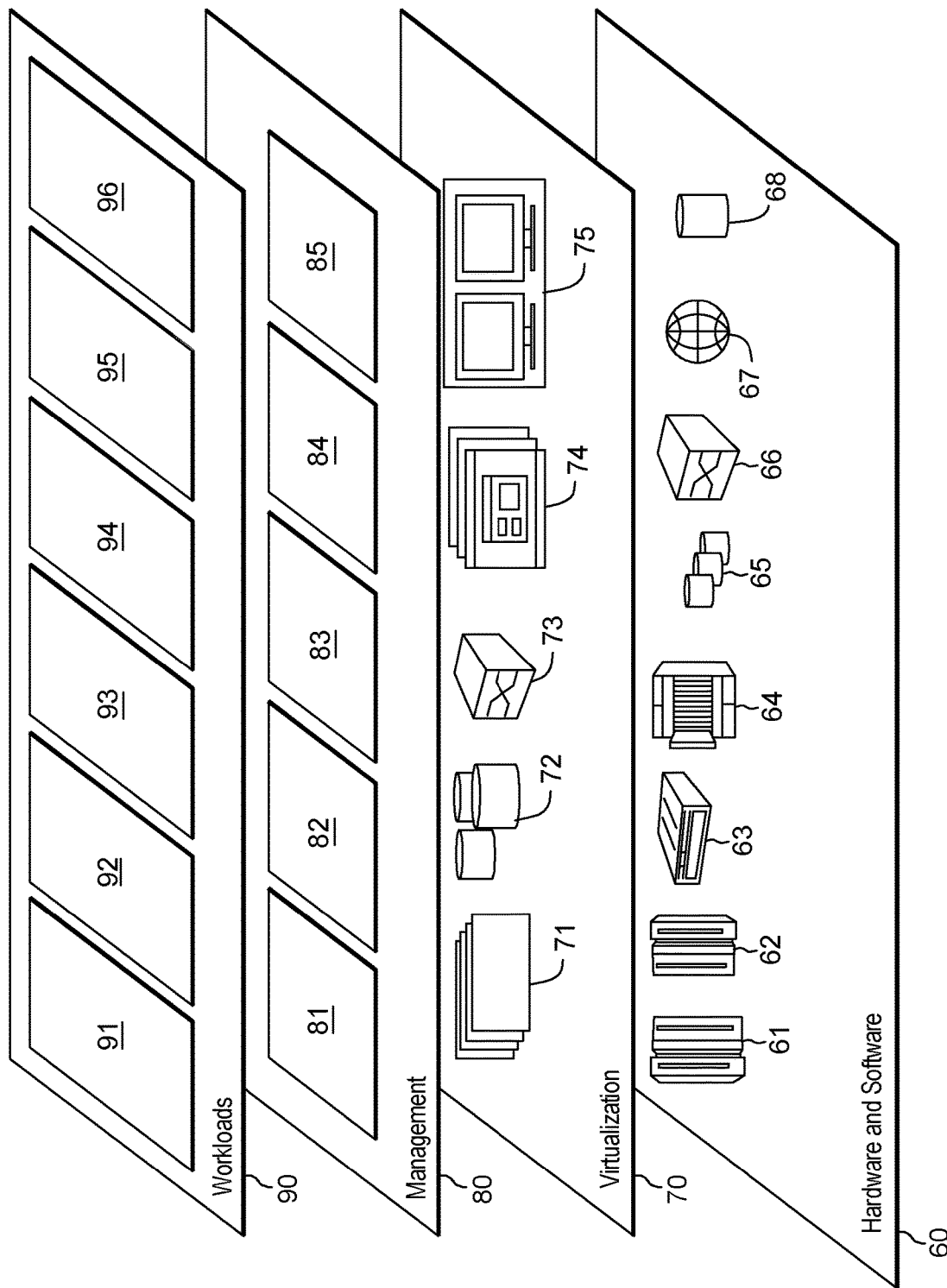
FIG. 10 depicts abstraction model layers according to one embodiment.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to method 200 of FIG. 3 and functions described with reference to manager system 110 as set forth in the flowchart of FIGS. 4A-4B. In one embodiment, one or more client computer device 130A-130Z can include one or more computing node 10 and can include one or more program 40 for performing functions described with reference to one or more client computer device 130A-130Z as set forth in the flowchart of FIGS. 4A-4B. In one embodiment, systems 150, 160, 170 can include one or more computing node 10 and can include one or more program 40 for performing functions described with reference to systems 150, 160, 170 as set forth in the flowchart of FIGS. 4A-4B. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/

Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for generating an inventory list and for providing notification and/or control data to client computer devices as set forth herein. The processing components 96 can be implemented with use of one or more program 40 described in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
obtaining item search query data from one or more mobile client computer device and location data associated to the item search query data, wherein the location data specifies a location of at least one of the one or more mobile client computer device when initiating an item search query;
processing the item search query data and the location data;
performing augmentation of an item inventory list associated to a venue in response to the processing indicating that a search query for an item has been initiated by a client computer device located at the venue, wherein the venue is a temporary event venue, and wherein the method includes determining that the temporary event venue is currently operating as a vending venue based on an examination of one or more factor; and
providing one or more output in dependence on the performing augmentation.

2. The method of claim 1, wherein the obtaining item search query data from one or more mobile client computer device includes obtaining item search query data from a first client computer device being used by a first user located at a first venue and obtaining item search query data from a second client computer device being used by a second user located at a second venue.

3. The method of claim 1, wherein the obtaining item search query data from one or more mobile client computer device includes obtaining item search query data from a first client computer device being used by a first user located at a first venue and obtaining item search query data from a second client computer device being used by a second user located at a second venue, wherein the providing one more output includes providing a notification to a third user using a third client computer device, the notification including a graphical depiction of a location of the first item within the first venue.

4. The method of claim 1, the obtaining item search query data from one or more mobile client computer device includes obtaining item search query data specifying a first item from a first client computer device being used by a first user at a first client computer device located at a first venue and obtaining item search query data specifying a second item from a second client computer device being used by a second user at a second client computer device located at the first venue, wherein the method includes determining that a third user has entered a spatial coordinate range of the first venue, and in response to the determining that the third user has entered a spatial coordinate range of the first venue, and wherein the providing one or more output in dependence on the performing augmentation includes sending notification data to a third client computer device of the third user to result in a map being displayed by the third client computer device, the map having a graphical depiction of the first venue and of item display locations within the first venue, the map displaying text based indicators of the first item of and the second item, and graphical depictions of respective locations of the first item and the second item within the first venue.

5. The method of claim 1, wherein the obtaining item search query data from one or more mobile client computer device includes obtaining item search query data specifying a first item from a first client computer device being used by a first user located at a first venue and obtaining item search query data specifying a second item from a second client computer device being used by a second user at a second client computer device located at a second venue, wherein the performing augmentation of an item inventory list includes adding the item searched for by the first user to the item inventory list, wherein the method includes determining that the first item matches one or more criterion specified by alert setup data defined by a by a third user, and wherein the providing one or more output in dependence on the performing augmentation includes sending notification data to the third user notifying the third user that the first item has been added to the item inventory list in response to the first item being added to the item inventory list.

6. The method of claim 1, wherein the providing one or more output includes providing guided tour navigation data to a certain mobile client computer device of the one or more client computer device in response to a certain item matching at least one criterion specified by alert configuration data defined by a certain user of the certain mobile client computer device has been added to the item inventory list, wherein the guided tour navigation data facilitates the certain user moving within a venue of in which the certain item in which the certain item is located to reach an item location of the certain item, wherein the guided tour navigation data results in presentation on a display of the certain mobile computer device a feature map that graphically depicts a layout of the venue, a specific location of the certain item within the venue, and a recommended travel path of the certain user within the venue.

7. The method of claim 1, wherein the providing one or more output includes providing guided tour navigation data to a certain mobile client computer device of the one or more client computer device, wherein the guided tour navigation data results in presentation on a display of the certain mobile computer device a feature map that visually depicts a layout of the venue, a specific location of the item within the venue, and a recommended travel path of user within the venue.

8. The method of claim 1, wherein the method includes determining that the search query for the item has been initiated by a client computer device located at a venue currently operating as a vending venue in dependence on a geo-classification of the venue in a geo-classification database that maps venue locations to uses associated to the venue locations.

9. The method of claim 1, wherein the method includes determining that the search query for the item has been initiated by a certain client computer device located at a venue currently operating as a vending venue in dependence on whether there are client computer devices of multiple different users currently within a common venue, and in dependence on a determining that there is an absence of a social connection amongst the multiple different users.

10. The method of claim 1, wherein the method includes determining that the search query for the item has been initiated by a client computer device located at a venue currently operating as a vending venue in dependence on returned data returned from a predictive model trained by machine learning, wherein the predictive model is trained to predict whether a venue from which a search is initiated is a venue currently operating a vending venue, wherein training data for training the predictive model includes historical query data for instances in which the venue was predicted to be a vending venue, and positive or negative reinforcement data associated to the historical query data.

11. The method of claim 1, wherein the method includes determining that the search query for the item has been initiated by a client computer device located at a venue currently operating as a vending venue in dependence on one or more of the following selected from the group consisting of: (a) administrator user settings data that specifies one or more venue classification more likely to be a vending venue for a certain classification of items, and (b) whether a time of initiation of an item search query is within business hours and in dependence on a time duration between a time of initiation of an item search query and a close of business time.

12. The method of claim 1, wherein the obtaining item search query data from one or more mobile client computer device includes obtaining item search query data for a first item from a first mobile client computer device being used by a first user located at a first venue, wherein there is displayed on the first mobile client computer device in response to entry of data defining the item search query data by the first user, each one or more of the following selected from the group consisting of: (a) an identifier of the first item, (a) a description of the first item, (c) a purchase price of the first item, (d) a feature area facilitating purchase of the first item, and (e) a feature area facilitating electronic communication with a seller of the first item.

13. The method of claim 1, wherein the examination of one or more factor includes examining a traveling pattern of a user in respect to the temporary event venue.

14. The method of claim 1, wherein the examination of one or more factor includes (a) ascertaining that there are client computer devices of multiple different users currently within the temporary event venue, and (b) discovering that there is an absence of a social connection amongst the multiple different users of (a).

15. A computer program product comprising:
a computer readable storage medium readable by one or more processing circuit and storing instructions for execution by one or more processor for performing a method comprising:
obtaining item search query data from one or more mobile client computer device and location data associated to the item search query data, wherein the location data specifies a location of at least one of the one or more mobile client computer device when initiating an item search query;
processing the item search query data and the location data;
performing augmentation of an item inventory list associated to a venue in response to the processing indicating that a search query for an item has been initiated by a client computer device located at the venue, wherein the venue is a temporary event venue, and wherein the method includes determining that the temporary event venue is currently operating as a vending venue based on an examination of one or more factor; and
providing one or more output in dependence on the performing augmentation.

16. The computer program product of claim 13, wherein the obtaining item search query data from one or more mobile client computer device includes obtaining first item search query data specifying a first item from a first client computer device being used by a first user at a first client computer device located at a first venue and obtaining second item search query data specifying a second item from a second client computer device being used by a second user at a second client computer device located at the first venue, wherein the method includes determining that a third user has entered a spatial coordinate range of the first venue, and in response to the determining that the third user has entered a spatial coordinate range of the first venue, and wherein the providing one or more output in dependence on the performing augmentation includes sending notification data to a third client computer device of the third user to result in a map being displayed by the third client computer device, the map having a graphical depiction of the first venue and of item display locations within the first venue, the map displaying text based indicators of the first item and the second item, and graphical depictions of respective locations of the first item and the second item within the first venue, wherein the first item search query is entered using a general search engine, and wherein the second item search query is entered using a generic item online vending portal.

17. The computer program product of claim 13, wherein the providing one or more output includes providing guided tour navigation data to a certain mobile client computer device of the one or more client computer device in response to a certain item matching at least one criterion specified by alert configuration data defined by a certain user of the certain mobile client computer device has been added to the item inventory list, wherein the guided tour navigation data facilitates the certain user moving within a venue of in which the certain item in which the certain item is located to reach an item location of the certain item, wherein the guided tour navigation data results in presentation on a display of the certain mobile computer device a feature map that graphically depicts a layout of the venue, a specific location of the certain item within the venue, and a recommended travel path of the certain user within the venue, wherein the obtaining item search query data from one or more mobile client computer device includes obtaining first item search query data specifying a first item from a first client computer device being used by a first user at a first client computer device located at a first venue and obtaining second item search query data specifying a second item from a second client computer device being used by a second user at a second client computer device located at the first venue, wherein the method includes determining that a third user has entered a spatial coordinate range of the first venue, and in response to the determining that the third user has entered a spatial coordinate range of the first venue, and wherein the providing one or more output in dependence on the performing augmentation includes sending notification data to a third client computer device of the third user to result in a map being displayed by the third client computer device, the map having a graphical depiction of the first venue and of item display locations within the first venue, the map displaying text based indicators of the first item and the second item, and graphical depictions of respective locations of the first item and the second item within the first venue, wherein the first item search query is entered using a general search engine, and wherein the second item search query is entered using a generic item online vending portal, wherein the method includes determining that the search query for the item has been initiated by a client computer device located at a venue currently operating as a vending venue in dependence on whether there have been multiple searches from multiple different client computer devices from a common venue within a specified time window.

18. The computer program product of claim 15, wherein the obtaining item search query data from one or more mobile client computer device includes obtaining item search query data for a first item from a first mobile client computer device being used by a first user located at a first venue, wherein there is displayed on the first mobile client computer device in response to entry of data defining the item search query data by the first user one or more of the following selected from the group consisting of: (a) an identifier of the first item, (b) a description of the first item, (c) a purchase price of the first item, (d) a feature area facilitating purchase of the first item, and (e) a feature area facilitating electronic communication with a seller of the first item.

19. A system comprising:
a memory;
at least one processor in communication with the memory; and
program instructions executable by one or more processor via the memory to perform a method comprising:
obtaining item search query data from one or more mobile client computer device and location data associated to the item search query data, wherein the location data specifies a location of at least one of the one or more mobile client computer device when initiating an item search query;
processing the item search query data and the location data;
performing augmentation of an item inventory list associated to a venue in response to the processing indicating that a search query for an item has been initiated by a client computer device located at the venue, wherein the venue is a temporary event venue, and wherein the method includes determining that the temporary event venue is currently operating as a vending venue based on an examination of one or more factor; and
providing one or more output in dependence on the performing augmentation.

20. The system of claim 19, wherein the examination of one or more factor includes (a) examining a traveling pattern of a user in respect to the temporary venue (b) ascertaining that there are client computer devices of multiple different users currently within the temporary event venue, and (c) discovering that there is an absence of a social connection amongst the multiple different users of (b).

* * * * *